(12) United States Patent
Wang et al.

(10) Patent No.: US 11,476,772 B2
(45) Date of Patent: Oct. 18, 2022

(54) VOLTAGE CONVERTER CIRCUIT FOR CONVERTING AC VOLTAGE TO DC VOLTAGE

(71) Applicant: EPISTAR CORPORATION, Hsinchu OT (TW)

(72) Inventors: Sheng-Bo Wang, Hsinchu (TW); Chiao Fu, Hsinchu (TW); Chang-Hsieh Wu, Hsinchu (TW); Jai-Tai Kuo, Hsinchu (TW); Chao-Kai Chang, Hsinchu (TW); Yao-Zhong Liu, Hsinchu (TW); Yi-Ru Shen, Hsinchu (TW); Chen-Yu Wang, Hsinchu (TW)

(73) Assignee: EPISTAR CORPORATION, Hsinchu (TW)

( * ) Notice: Subject to any disclaimer, the term of this patent is extended or adjusted under 35 U.S.C. 154(b) by 0 days.

(21) Appl. No.: 16/944,742

(22) Filed: Jul. 31, 2020

(65) Prior Publication Data

US 2021/0126548 A1    Apr. 29, 2021

(30) Foreign Application Priority Data

Jul. 31, 2019  (TW) .................................. 108127287

(51) Int. Cl.
*H02M 7/217*    (2006.01)
*H02M 1/08*    (2006.01)

(52) U.S. Cl.
CPC ............. *H02M 7/217* (2013.01); *H02M 1/08* (2013.01)

(58) Field of Classification Search
CPC ................................ H02M 7/217; H02M 1/08
USPC .......................................................... 363/126
See application file for complete search history.

(56) References Cited

U.S. PATENT DOCUMENTS

| | | | | |
|---|---|---|---|---|
| 3,393,347 A | * | 7/1968 | Webb | G05F 1/573 361/18 |
| 4,128,867 A | * | 12/1978 | Heyman | H02M 5/458 363/21.01 |
| 5,877,614 A | * | 3/1999 | Huber | G05F 1/56 323/282 |
| 6,323,629 B1 | * | 11/2001 | Scruggs | G01C 19/661 323/312 |
| 2014/0265844 A1 | * | 9/2014 | Sadwick | H05B 33/0815 315/85 |

* cited by examiner

*Primary Examiner* — Yemane Mehari
(74) *Attorney, Agent, or Firm* — Muncy, Geissler, Olds & Lowe, P.C.

(57) ABSTRACT

A voltage converter circuit, comprising: a bridge rectifier; a first transistor, having a first end, a second end and a third end; a second transistor, having a first end and a second end; wherein the first end of the first transistor and the first end of second transistor are electrically connected to bridge rectifier, and the second end of the first transistor is electrically connected to the first end of the second transistor; and a Zener diode, connected between the third end of the first transistor and the second end of the second transistor.

11 Claims, 28 Drawing Sheets

| | VIN(AC) | LED current (mA) | Power (W) | Power factor |
|---|---|---|---|---|
| Lighting circuit 1 | | 38.72 | 7 | 0.81 |
| Lighting circuit 2 | 230Vac | 63.75 | 8.49 | 0.579 |
| Lighting circuit 3 | | 43.8 | 7.74 | 0.76 |

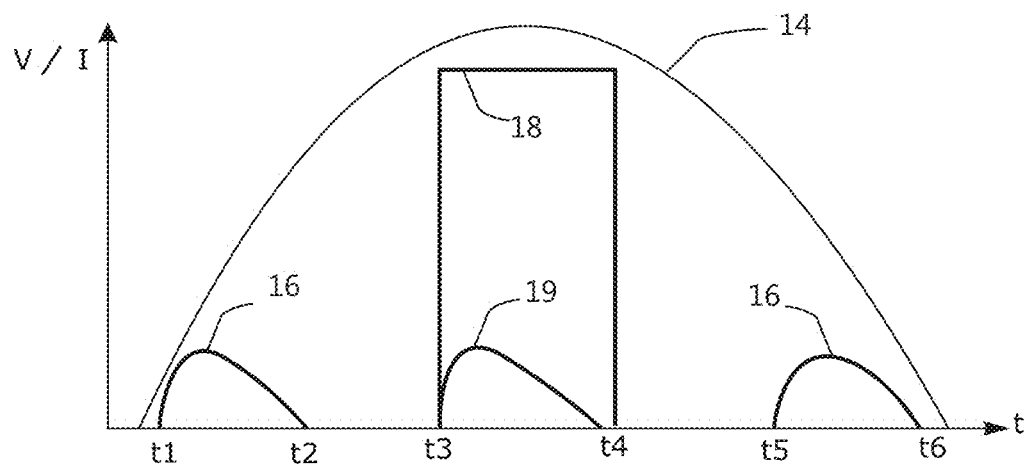
FIG. 8B
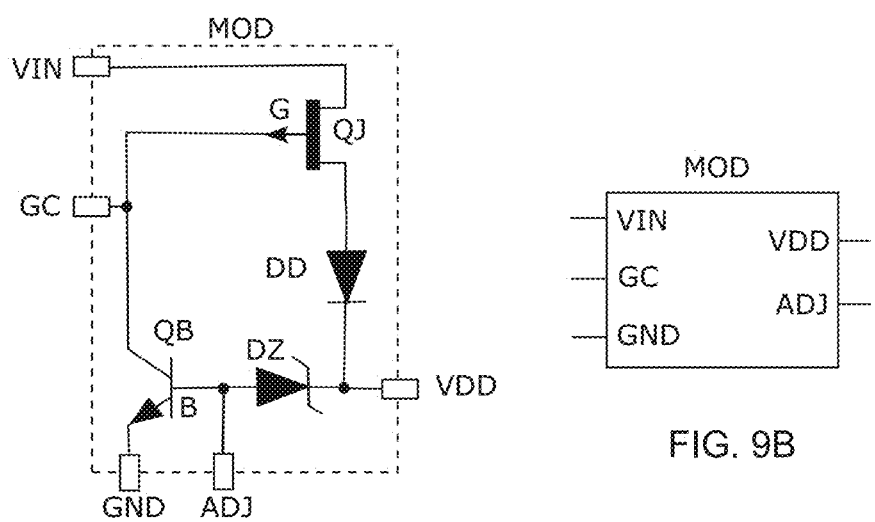
FIG. 9A
FIG. 9B

VOLTAGE CONVERTER CIRCUIT FOR CONVERTING AC VOLTAGE TO DC VOLTAGE

CROSS-REFERENCE TO RELATED APPLICATIONS

This application claims priority to the benefit of Taiwan Patent Application Number 108127287 filed on Jul. 31, 2019 and the entire contents of which are hereby incorporated by reference herein in their entireties.

BACKGROUND

Technical Field

The present disclosure relates to a voltage converter circuitry, more specifically, to a circuit design for converting AC voltage to DC voltage.

Description of the Related Art

The power provided by supply mains usually has AC voltage rated at 110V (or 220V)/60 Hz, while the common operation voltages for controlling integrated circuits (IC) are usually DC voltages within a voltage range of 3.3V to 12V. It is necessary to transform the supply mains to a required power for IC. Traditionally, the AC to DC voltage converter circuit is constructed by CMOS and usually introduces high loss and requires many components which lead to low transforming efficiency and large space occupation.

SUMMARY OF THE DISCLOSURE

A voltage converter circuit, including a bridge rectifier; a first transistor, having a first end, a second end and a third end; a second transistor, having a first end and a second end; wherein the first end of the first transistor and the first end of second transistor are electrically connected to bridge rectifier, and the second end of the first transistor is electrically connected to the first end of the second transistor; and a Zener diode, connected between the third end of the first transistor and the second end of the second transistor.

BRIEF DESCRIPTION OF THE DRAWINGS

FIG. 8B shows voltage waveform of DC power VDC-IN, current waveform of charging current ILDO, current waveform of charging current ICHG,D13, current waveform of current $I_{LED}$.

FIG. 9A shows a packaged integrated circuit MOD in accordance with an embodiment of the present application; FIG. 9B shows a circuit symbol of the integrated circuit MOD.

DETAILED DESCRIPTION OF THE EMBODIMENTS

To better and concisely explain the disclosure, the same name or the same reference number given or appeared in different paragraphs or figures along the specification should has the same or equivalent meanings while it is once defined anywhere of the disclosure.

Figure 1A:
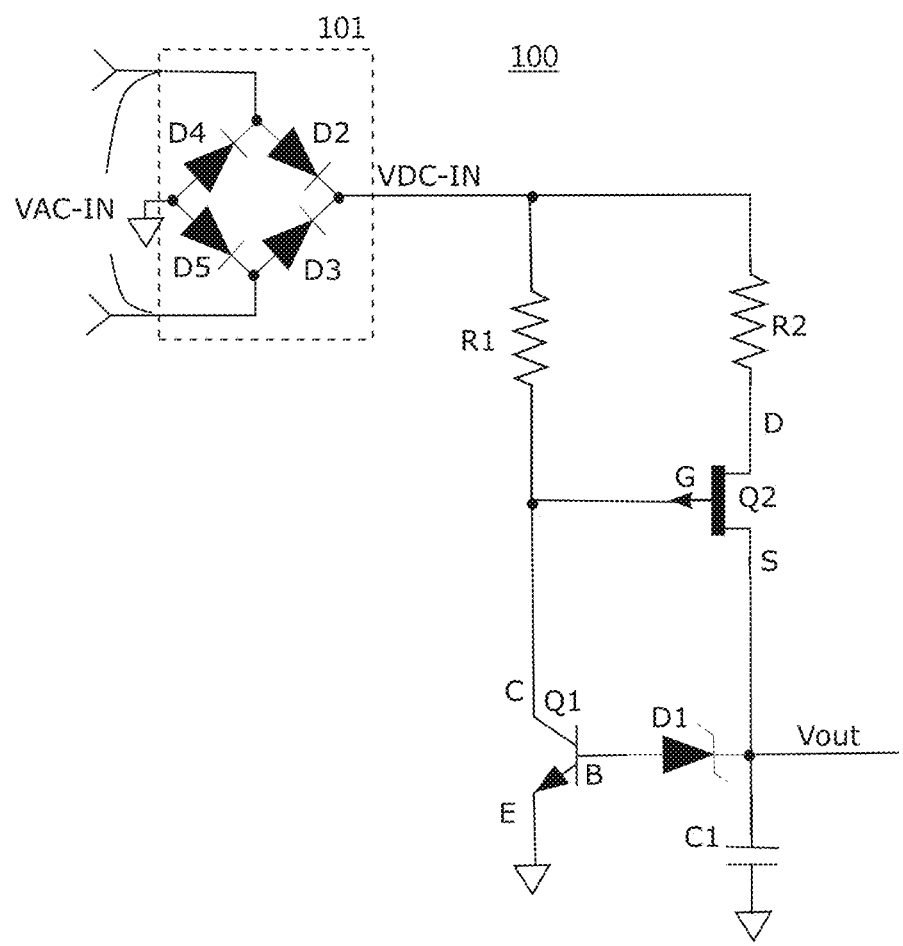
FIG. 1A shows a schematic diagram of a voltage converter circuit in accordance with an embodiment of the present application.

FIG. 1A shows a schematic diagram of a voltage converter circuit 100 in accordance with an embodiment of the present application. The voltage converter circuit 100 selectively provides an output power having stable output voltage to one circuit through a connecting node Vout based on an AC input power. The voltage converter circuit 100 includes a bridge rectifier 101, resistors R1, R2, transistors Q1, Q2, a Zener diode D1, and a capacitor C1. The transistor Q1 can be a bipolar junction transistor (BJT), such as an NPN BJT. The transistor Q2 can be a high electron mobility transistor (HEMT), such as a depletion mode HEMT (D-mode HEMT). The transistor Q1 has a base B, a collector C, and an emitter E. The transistor Q2 has a gate G, a drain D, and a source S. The collector C and the drain D are electrically connected to the bridge rectifier 101. The gate G is electrically connected to the collector C. The cathode of the Zener diode D1 is electrically connected to the connecting node Vout and the anode of the Zener diode D1 is electrically connected to the base B.

The bridge rectifier 101 includes four rectifier diodes D2-D5. In one embodiment, the rectifier diodes can be Schottky Barrier Diodes (SBD). The bridge rectifier 101 rectifies the AC input power VAC-IN to generate DC power VDC-IN and ground voltage. For example, AC input power VAC-IN can be supply mains with 110 VAC·220 VAC, or 230 VAC. The term VAC represents a voltage of an AC power. The ground voltage serves as a reference of 0V for the whole voltage converter circuit 100.

Figure 1B:
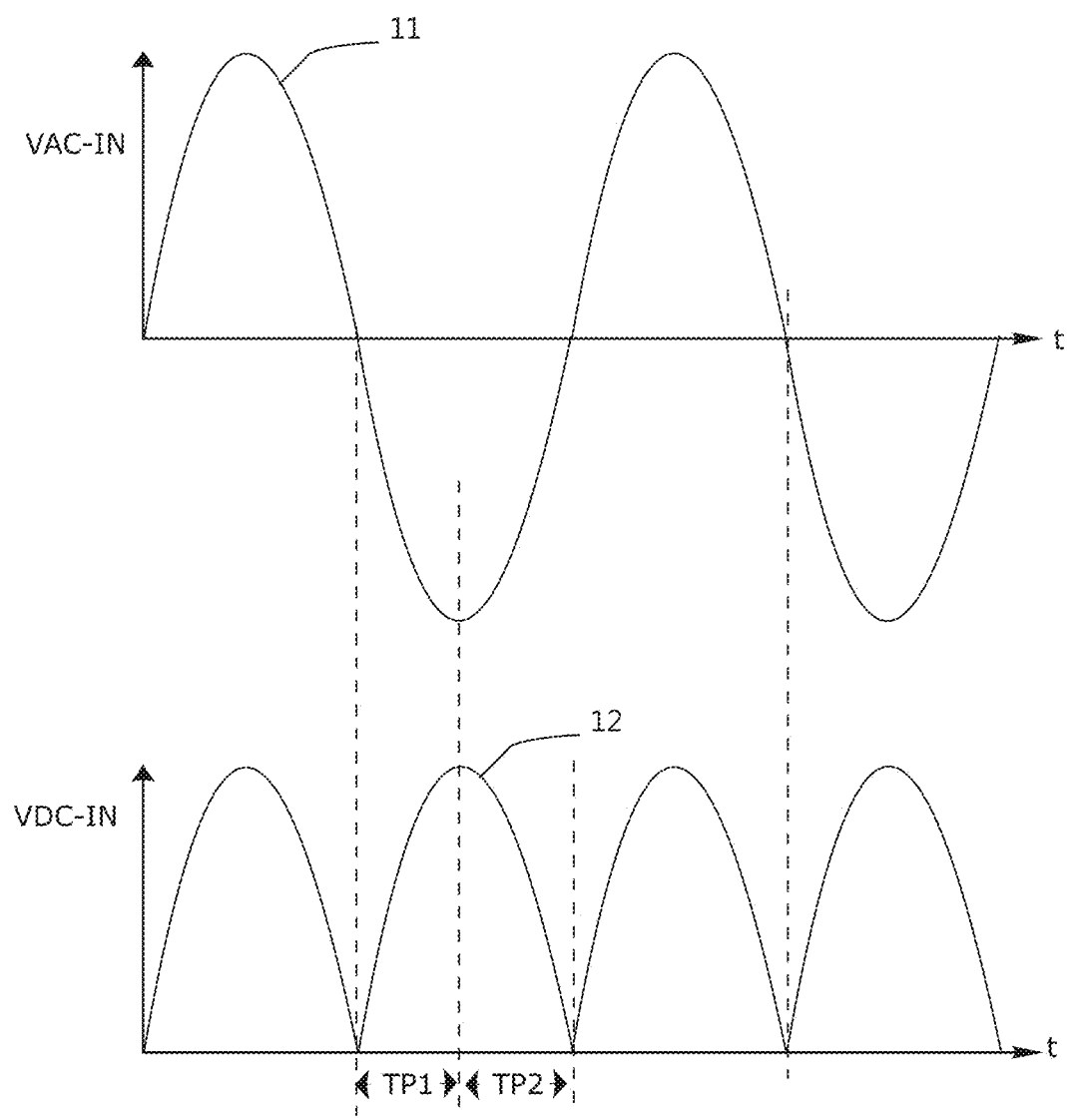
FIG. 1B shows a voltage waveform of an AC input power converted to a DC power.

FIG. 1B shows a voltage waveform 11 of an AC input power VAC-IN and a voltage waveform 12 of the DC power VDC-IN. For example, the voltage waveform of the AC input power VAC-IN can be a sinusoid with 220 VAC. For clarity, VAC herein represents the RMS voltage value of an alternative voltage, which is corresponding to a common definition. The bridge rectifier 101 performs full-wave rectification to convert the negative voltage part of the voltage waveform 11 to positive voltage to form the voltage waveform 12. The period TP1 is an interval for increasing the DC power VDC-IN and the period TP2 is an interval for decreasing the DC power VDC-IN.

The transistor Q2 receives a voltage of DC power VDC-IN through gate G. The transistor Q2 is turned-on and generates a current from drain D to source S when the voltage between the gate G and the source S is larger than a threshold voltage of the transistor Q2. Thus, the DC power VDC-IN can charge the capacitor C1 through resistor R2 and the transistor Q2 so the output voltage of the connecting node Vout is increased. In the voltage converter circuit 100, the resistor R2 limits the maximum of the current flowing through the transistor Q2. The output voltage at the connecting node Vout turns the transistor Q1 on when the output voltage of the connecting node Vout is increased to a default voltage enough to breakdown the Zener diode D1, then the ground voltage is applied to the gate G of the transistor Q2 through the transistor Q1 to turn off the transistor Q2. After the transistor Q2 is turned off, the DC power VDC-IN stops charging the capacitor C1 so the capacitor is not charged to stabilize the output voltage when being charged to a default voltage, which causes the breakdown of the Zener diode D1 and turns off the transistor Q1.

Figure 2:
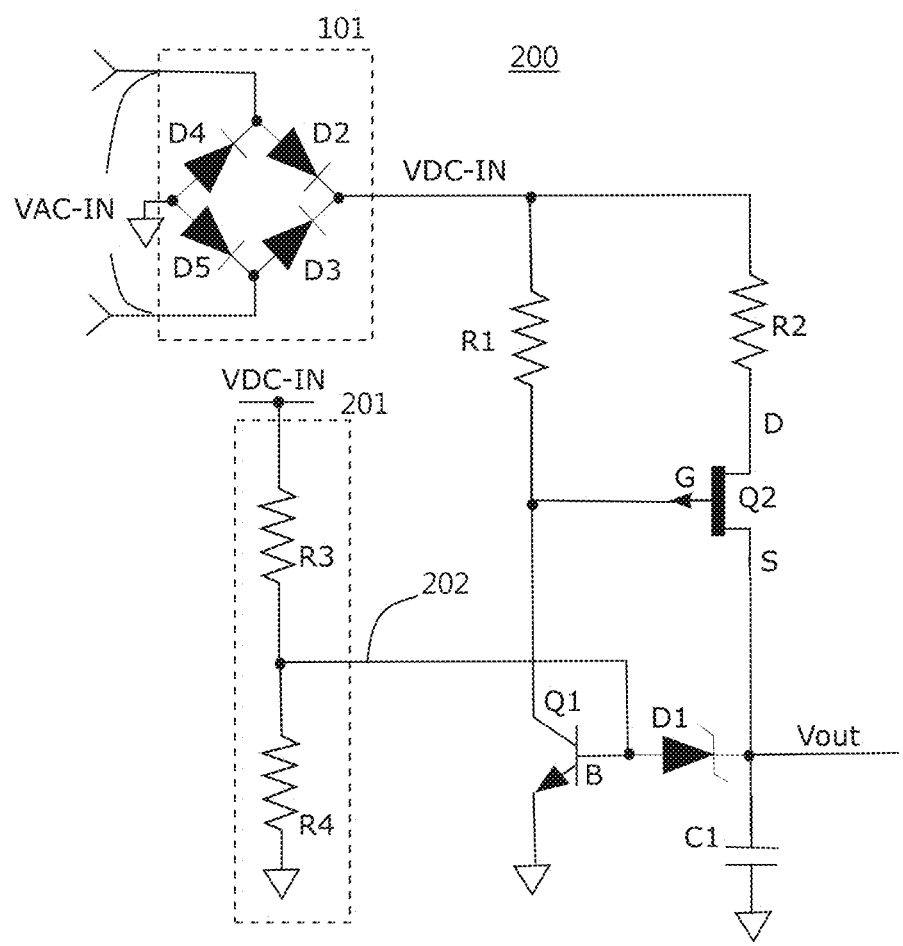
FIG. 2 shows a schematic diagram of a voltage converter circuit in accordance with another embodiment of the present application.

FIG. 2 shows a voltage converter circuit 200 converting an AC voltage to a DC voltage in accordance with another embodiment of the present application. The voltage converter circuit 200 provides a stable output voltage at the connecting node Vout based on the AC input power VAC-IN. The voltage converter circuit 200 includes a bridge rectifier 101, resistors R1, R2, transistors Q1, Q2, a Zener diode D1, and a capacitor C1. A cathode of the Zener diode D1 is electrically connected to a connecting node Vout. An anode of the Zener diode D1 is electrically connected to the base B of the transistor Q1. The voltage converter circuit 200 further includes a voltage divider circuit 201 having a resistor R3 and a resistor R4. Components, configuration, controls and/or operations the same as or similar to the foregoing embodiments described with respect to FIGS. 1A and 1B may be employed in the embodiment of FIG. 2, and detailed explanation thereof may be omitted.

In comparison with the voltage converter circuit 100 in FIG. 1, the voltage converter circuit 200 in FIG. 2 further includes a voltage divider circuit 201 including the resistors R3, R4 serially connected. One end of the resistor R3 is electrically connected to the DC power VDC-IN and one end of the resistor R4 is electrically connected to the ground voltage. The voltage of the connecting node 202 is determined by the resistance of the resistor R3 and the resistance of the resistor R4. For example, when the resistance of the resistor R3 is 10K ohm and the resistance of the resistor R4 is 7K ohm, the voltage of the connecting node 202 is $7/17$ of the voltage of DC power VDC-IN. Thus, the base B electrically connected to the connecting node 202 is applied with the voltage at the connecting node 202. When the voltage of the DC power VDC-IN increases, the voltage of the base B is increased and the transistor Q1 is turned on accordingly. Thus, the gate G of the transistor Q2 receives the ground voltage through the turned-on transistor Q1 to turn off the transistor Q2. As the aforementioned, with the transistor Q2 being turned off, the capacitor is not charged by the DC power VDC-IN. Thus, the capacitor C1 is not charged when the DC power VDC-IN increases to a relatively high voltage so the transistor Q2 is protected from being damaged by a large current induced by an overly high drain-to-source voltage. In other words, the voltage converter circuit 200 supplies power when the voltage of the DC power VDC-IN is around the wave trough and does not supply power when the voltage of the DC power VDC-IN is around the wave crest. The charging operation is referred as trough charging in the present application. The transition of the charging operation can be determined by the resistance of the resistor R3 and the resistance of resistor R4 and is not limited herein.

Figure 3:
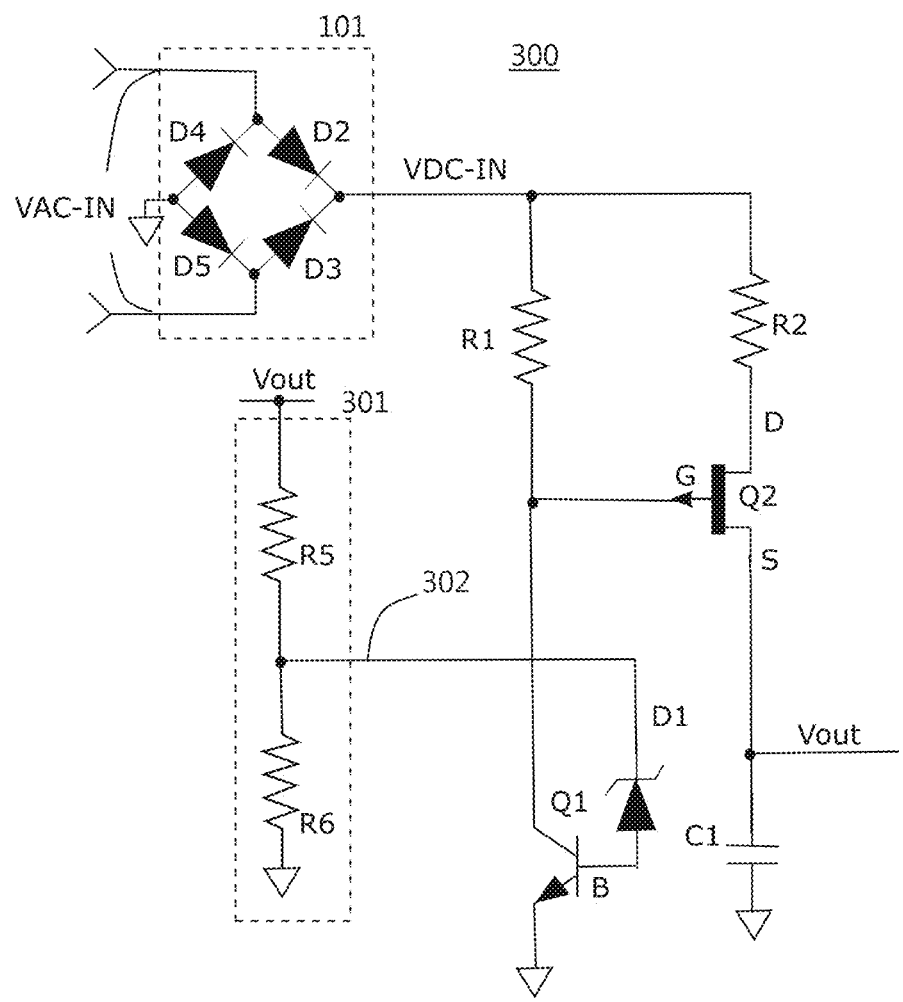
FIG. 3 shows a schematic diagram of a voltage converter circuit in accordance with further another embodiment of the present application.

FIG. 3 shows a voltage converter circuit 300 for converting AC voltage to DC voltage in accordance with another embodiment of the present application. The voltage converter circuit 300 includes a bridge rectifier 101, resistors R1, R2, transistors Q1, Q2, a Zener diode D1, and a capacitor C1. The voltage converter circuit 300 further includes an adjustable voltage divider circuit 301. The adjustable voltage divider circuit 301 includes a variable resistor R5 and a resistor R6. An anode of the Zener diode D1 is electrically connected to a base B of the transistor Q1 and a cathode of the Zener diode D1 is electrically connected to the connecting node Vout through the variable resistor R5.

Components, configuration, controls and/or operations the same as or similar to the foregoing embodiments described with respect to FIGS. 1A-2 may be employed in the embodiment of FIG. 3, and detailed explanation thereof may be omitted.

The voltage converter circuit 300 provides a stable output voltage through the connecting node Vout and the output voltage can be determined by adjusting the resistance of the variable resistor R5 or the resistance of the resistor R6. In other words, voltage converter circuit 300 provides an output power for a connected load.

The transistor Q2 is turned-on based on the voltage of the DC power VDC-IN received by a gate G and generates a current flowing from a drain D to a source S for the DC power VDC-IN to charge the capacitor C1 through the resistor R2 and transistor Q2 so the voltage of the connecting node Vout is increased. The voltage of the connecting node Vout can be applied to a cathode of the Zener diode D1 through the adjustable voltage divider circuit 301. The voltage of the connecting node 302 can be determined by the resistance of the resistor R5 and the resistance of the resistor R6. For example, the voltage of the connecting node 302 is half of the voltage of connecting node Vout when the resistance of the variable resistor R5 is 10K ohm and the resistor R6 is 10K ohm. Hence the voltage of half of the voltage of connecting node Vout is also applied to cathode of the Zener diode D1 that is connected to the connecting node 302. The voltage of the connecting node 302 is increased when the output voltage of the connecting node Vout is increased. The voltage of the connecting node 302 is applied to the base B of the transistor Q1 through the Zener diode D1 and turns on the transistor Q1 when the voltage of the connecting node 302 is increased and is enough to cause the breakdown of the Zener diode D1. Due the conduction of the transistor Q1, the gate G of the transistor Q2 receives a ground voltage (usually referred as 0 volt) through the transistor Q1. In that case, the transistor Q2 is turned off so the capacitor is not charged by the DC power VDC-IN.

Due to adjustable resistance of variable resistor R5, the output voltage of the connecting node Vout can be changed by adjusting the resistance ratio between resistances of variable resistor R5 and resistor R6, thus an expected output voltage at the connecting node can be set. For example, the voltage of the connecting node 302 is half of the voltage of connecting node Vout when the resistance of the variable resistor R5 is 10K ohm and the resistor R6 is 10K ohm; the voltage of the connecting node 302 is two-thirds of the voltage of connecting node Vout when the resistance of the variable resistor R5 is 5K ohm and the resistor R6 is 10K ohm. The output voltage at the connecting node Vout can be changed by adjusting the resistance of the variable resistor based on the fixed breakdown voltage of the Zener diode D1. Thus, by adjusting the resistance of the variable resistor R5, the voltage converter circuit 300 can stop charging the capacitor C1 when the voltage of the connecting node Vout is increased to a default voltage value.

In another embodiment, referring to FIG. 3, the connecting node 302 is directly connected to the base B of the transistor Q1 without the Zener diode D1. Specifically, the voltage of the connecting node 302 is (R6/(R5+R6))×(the voltage of the connecting node Vout). When the output voltage of the connecting node Vout is increased to make the voltage of the connecting node 302 substantially equal to a conducting voltage (which is usually 0.4V~0.7V caused by the voltage difference between the base and the emitter of the transistor Q1), the transistor Q1 is turned on to lower the gate voltage of the transistor Q2 so the transistor Q2 is turned off. In that case, the DC power stops charging the capacitor C1 and the output voltage is stabilized.

In another embodiment, referring to FIG. 3, the Zener diode D1 in the voltage converter circuit 300 is substituted by another diode. The anode of the diode is connected to the connecting node 302 and the cathode of the diode is connected to the base of the transistor Q1. The voltage of the connecting node 302 can be changed by adjusting the resistance of the variable resistor R5 or the resistance of the resistor R6. Specifically, the voltage of the connecting node 302 is (R6/(R5+R6))×(voltage of connecting node Vout). When the voltage of the connecting node Vout is increased to make the voltage of the connecting node 302 reach a sum of conducting voltage of transistor Q1 plus the forward voltage of the diode, the transistor Q1 is turned on and the gate G of the transistor Q2 receives the ground voltage through the transistor Q1 so the transistor Q2 is turned off. In that case, the capacitor C1 is not charged by the DC power VDC-IN, and stable output voltage is provided.

Figure 4:
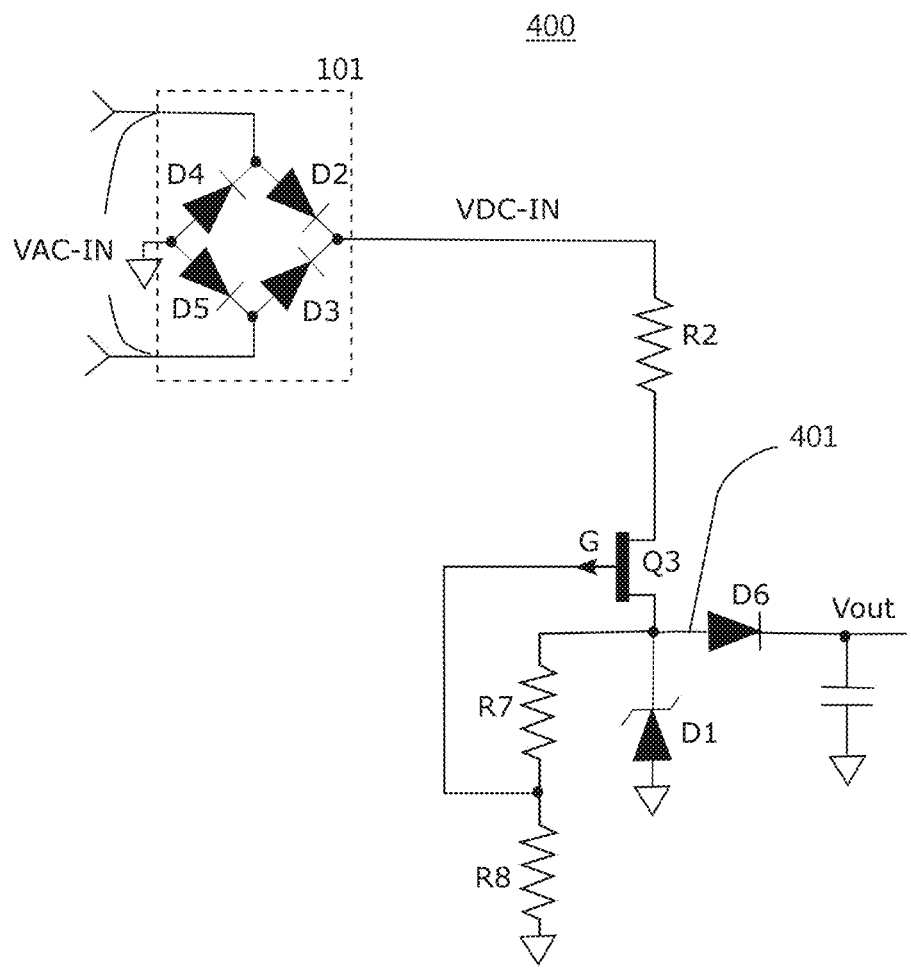
FIG. 4 shows a schematic diagram of a voltage converter circuit in accordance with further another embodiment of the present application.

FIG. 4 shows a voltage converter circuit 400 in accordance with another embodiment of the present application for converting AC voltage to DC voltage. The voltage converter circuit 400 includes a bridge rectifier 101, resistors R2, R7, R8, a transistor Q3, a Zener diode D1, a diode D6, and a capacitor C1. The transistor Q3 can be a high electron mobility transistor (HEMT). Specifically, the transistor Q3 can be a Depletion-mode HEMT. An anode of the diode D6, a cathode of the Zener diode D1, one end of the resistor R7, and a source of the transistor Q3 are electrically connected to the connecting node 401. The other end of the resistor R7, one end of the resistor R8, and a gate of the transistor Q3 are electrically connected to a connecting node 402. A cathode of the diode D6 and one end of the capacitor C1 are electrically connected to the connecting node Vout. Components, configuration, controls and/or operations the same as or similar to the foregoing embodiments described with respect to FIGS. 1A-3 may be employed in the embodiment of FIG. 4, and detailed explanation thereof may be omitted.

In this embodiment, the DC power VDC-IN charges the capacitor C1 through a path including the resistor R2, the transistor Q3, the diode D6 and the capacitor C1 when the transistor Q3 is turned on. The voltage of connecting node 401 is increased with the increase of the voltage of the DC power VDC-IN. When the voltage of the connecting node 401 is increased to cause the Zener diode D1 break-down, the voltage of the connecting node 401 is set to the breakdown voltage of the Zener diode D1, and thus the voltage of the connecting node Vout is set to a default voltage. In other words, the Zener diode D1 limits the voltage of the connecting node Vout to prevent the output voltage of the connecting node Vout from exceeding the default voltage value so the over-voltage protection is achieved.

The gate-to-source voltage Vgs of the transistor Q3 determines whether the transistor Q3 is turned on or not. In the voltage converter circuit 400, voltage Vgs represents the electric potential difference between the connecting node 401 and the connecting node 402. The connecting node 401 has a voltage V401 and the connecting node 402 has a voltage V402 represented as V401*R8/(R7+R8). Thus, the voltage Vgs is V402−V401=−V401*R7/(R7+R8). When the voltage of the DC power VDC-IN increases, the voltage V401 is increased accordingly; when the voltage of the DC power VDC-IN reaches a corresponding default voltage, the voltage Vgs reaches a negative voltage and is sufficient to turn off the transistor Q3, and thus the capacitor C1 is not charged when the voltage V401 is increased to an expected high voltage. As a result, the resistors R7, R8 can be arranged to set the voltage V401 and the output voltage at the connecting node Vout to stabilize the output voltage.

Figure 5:
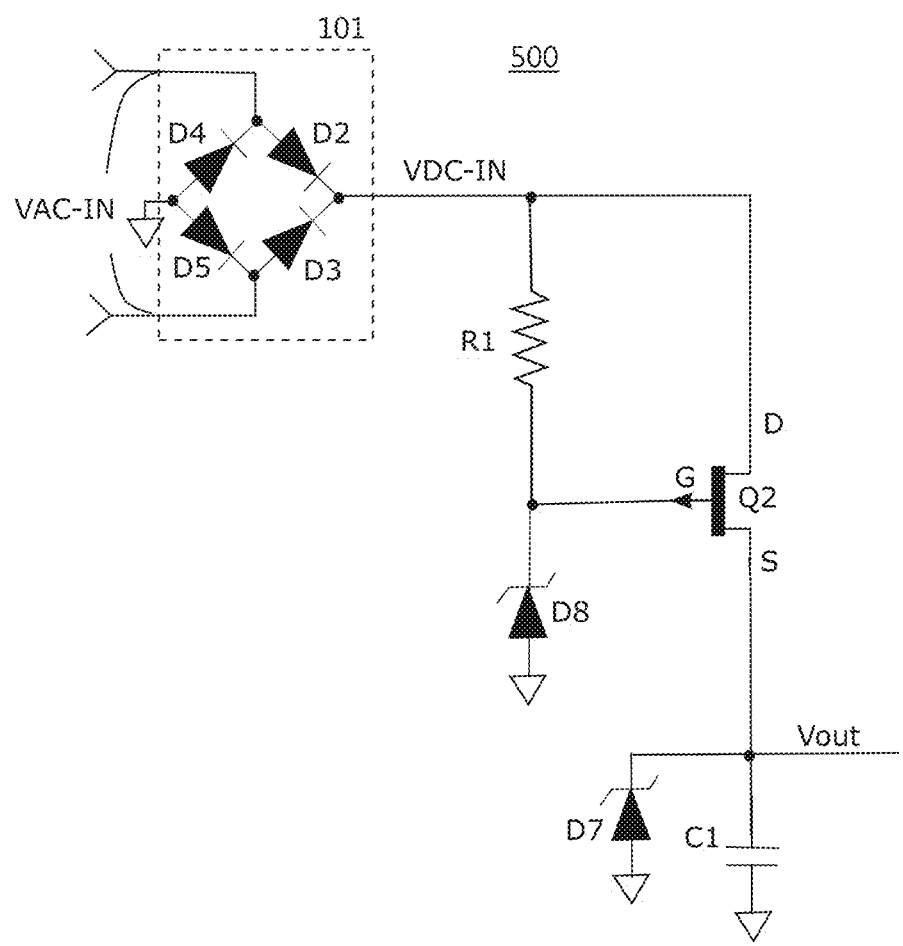
FIG. 5 shows a schematic diagram of a voltage converter circuit in accordance with further another embodiment of the present application.

FIG. 5 shows a voltage converter circuit 500 for converting AC voltage to DC voltage in accordance with another embodiment of the present application. The voltage converter circuit 500 includes a bridge rectifier 101, a resistor R1, a transistor Q3, Zener diodes D7, D8, and a capacitor C1. Components, configuration, controls and/or operations the same as or similar to the foregoing embodiments described with respect to FIGS. 1A-4 may be employed in the embodiment of FIG. 5, and detailed explanation thereof may be omitted. The voltage converter circuit 500 provides a stable output voltage through connecting node Vout and the output voltage can be set by Zener diode D8 with over-voltage protection provided by Zener diode D7.

In the voltage converter circuit 500, the voltage difference of two end of Zener diode D8 is breakdown voltage VBD8 when the Zener diode D8 is at the status of breakdown. In that case, the output voltage at the connecting node Vout is limited approximately to the breakdown voltage VBD8 minus a threshold voltage of the transistor Q3 and is substantially a constant value determined by the breakdown voltage VBD8. To avoid the connecting node Vout from overvoltage due to malfunctions of transistor Q3 or the Zener diode D8, the Zener diode D7 having a breakdown voltage near a certain overvoltage value can be adapted to the circuit to achieve over voltage protection (OVP).

Figure 6:
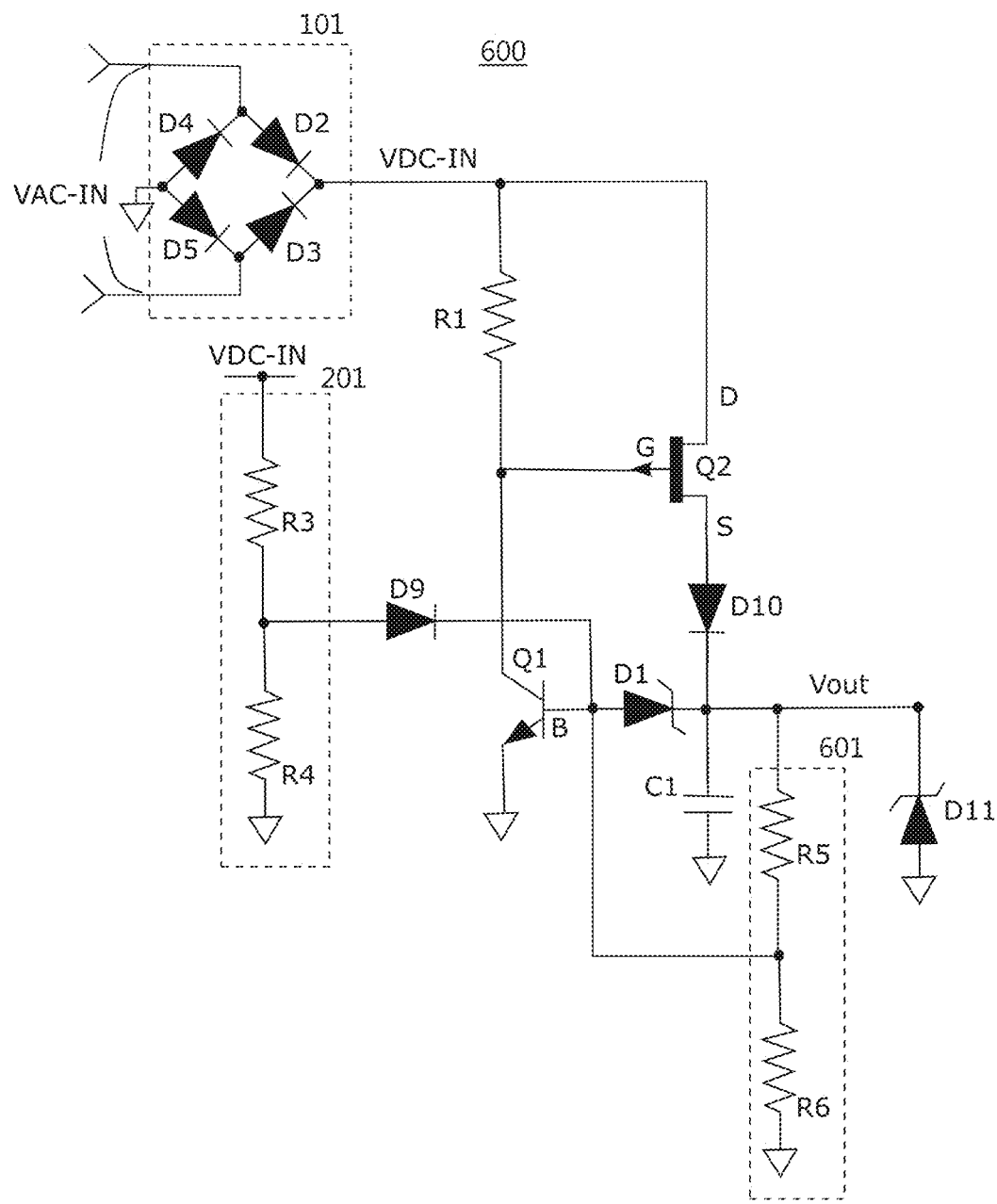
FIG. 6 shows a schematic diagram of a voltage converter circuit in accordance with further another embodiment of the present application.

FIG. 6 shows a voltage converter circuit 600 for converting AC voltage to DC voltage in accordance with another embodiment. The voltage converter circuit 600 includes a bridge rectifier 101, voltage divider circuits 201, 601, a resistor, R1, transistors Q1, Q2, Zener diodes D1, D11, diodes D9, D10, and a capacitor C1. The voltage divider 201 includes resistors R3, R4. The voltage divider 601 includes resistors R5, R6. Components, configuration, controls and/or operations the same as or similar to the foregoing embodiments described with respect to FIGS. 1A-5 may be employed in the embodiment of FIG. 6, and detailed explanation thereof may be omitted.

The voltage converter circuit 600 provides a stable output voltage at the connecting node Vout and the output voltage can be determined by the voltage divider circuit 601 including resistors R5, R6.

The Zener diode D11 and Zener diode D1 provide overvoltage protection. Specifically, either the breakdown of the Zener diode D11 or Zener diode D1 can be triggered when the output voltage of the connecting node Vout is higher than a default level so the output voltage at the connecting node Vout can be constrained.

The voltage divider circuit 201 (including resistors R3, R4) and the related connection parts provide a function of trough charging. The voltage converter circuit 600 stops supplying power to connecting node Vout (or to the output power) when the voltage of the DC power VDC-IN exceeds a default value set by the resistor R3 and the resistor R4.

The diodes D9, D10 prevent the output voltage of the connecting node Vout from charging the DC power VDC-IN when the voltage of the power VDC-IN is low.

Figures 7A, 7B:
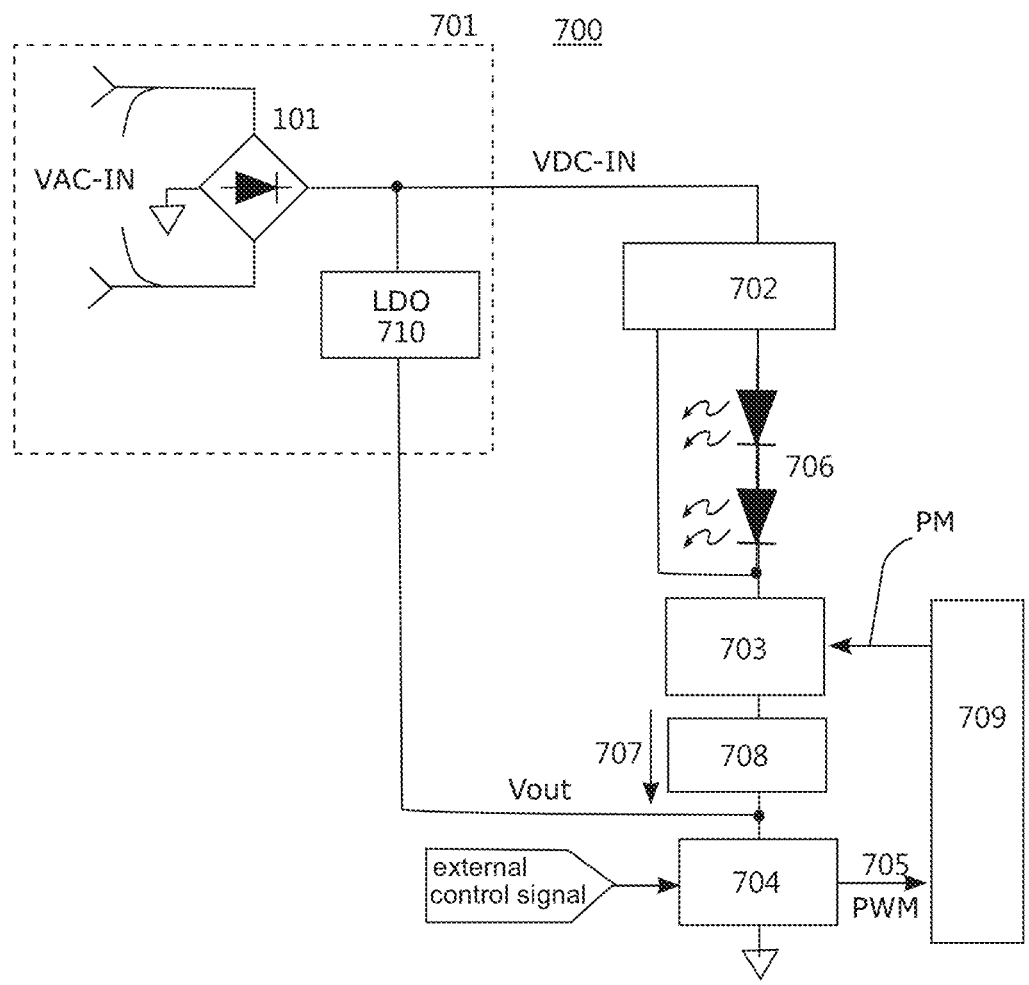
FIGS. 7A AND 7B illustrate a lighting circuit in accordance with an embodiment of the present application.

FIG. 7A shows adapting a voltage converter circuit to a lighting circuit 700 in accordance with another embodiment of the present application. The lighting circuit 700 includes a voltage converter circuit 701, a flicker reduction circuit 702, a constant current circuit 703, a wireless module 704, a charging circuit 708, a level shifter 709, and a light source 706.

The voltage converter circuit 701 can be one of the voltage converter circuits 100, 200, 300, 400, 500, 600. The voltage converter circuit 701 includes bridge rectifier 101 and low dropout linear regulator 710 (LDO). The voltage converter circuit 701 provides a DC power VDC-IN and a stable output voltage at a connecting node Vout (or to an output power) as an input power for the wireless module 704. For example, if the previous voltage converter circuit 100 is regarded as the voltage converter circuit 701, the LDO 710 may include the circuits other than the bridge rectifier 101 in voltage converting circuit 100.

The wireless module 704 can be a Bluetooth module or a WIFI module. The light source 706 can include a plurality of light emitting diodes (LED) and the LEDs are serially connected. The LEDs can be the same or different. In one embodiment, the light source 706 can withstand high voltage. In one embodiment, the wireless module 704 can receive an external control signal to generate a pulse width modulation (PWM) signal 705 as a dimming signal. The constant current circuit 703 receives the PWM signal 705. The luminous intensity of light source 706 can be changed by adjusting the frequency or the pulse width of the PWM signal 705, which is regarded as dimming.

The level shifter 709 can transform the PWM signal 705 to a dimming signal having a proper voltage for the constant current circuit 703. For example, when the PWM signal 705 represents logic "0", the corresponding voltage of the PWM signal is 0V, and the level shifter 709 provides a dimming signal to 8V at the connecting node PM accordingly; when the PWM signal 705 represents logic "1", the corresponding voltage of the PWM signal is 3.3V, and the level shifter 709 provides a dimming signal to 4V at the connecting node PM accordingly. In other embodiments, the level shifter 709 can be omitted if the voltage of the pulse width modulation signal 705 can be utilized by the constant current circuit 703.

The lighting circuit 700 further includes a charging circuit 708 providing a charging path 707. A part of the current of the constant current circuit 703 could be provided to the voltage converter circuit 701 or be provided to the wireless module 704 for increasing the power factor of the whole circuit. For example, the charging circuit 708 can charge the output power of the voltage converter circuit 701 or charge the wireless module 704 with a part of the current flowing through the light source 706 when the PWM signal 705 drives the light source 706 to emit light.

In FIG. 7B, the lighting circuit 1 represents an embodiment where the wireless module 704 and charging path 707 is omitted in the lighting circuit 700, the lighting circuit 2 represents an embodiment where the charging path 707 is omitted in the lighting circuit 700, and the lighting circuit 3 represents an embodiment of the lighting circuit 700. In table 1, the lighting circuit 1 has the largest power factor while the power factor of the lighting circuit 2 is the smallest. The reason may be that the LDO 710 has a trough charging function so the DC power VDC-IN provides current when the voltage of the DC power VDC-IN is around wave trough and the power factor is decreased. The power factor of the lighting circuit 3 (lighting circuit 700) has a larger power factor than the lighting circuit 2 due to the charging path 707. Specifically, the charging circuit 708 charges the voltage converter circuit 701 or supplies power to the wireless module 704 when the voltage of the DC power VDC-IN is around the voltage crest so the harm of trough charging on power factor is eased.

Figure 8A:
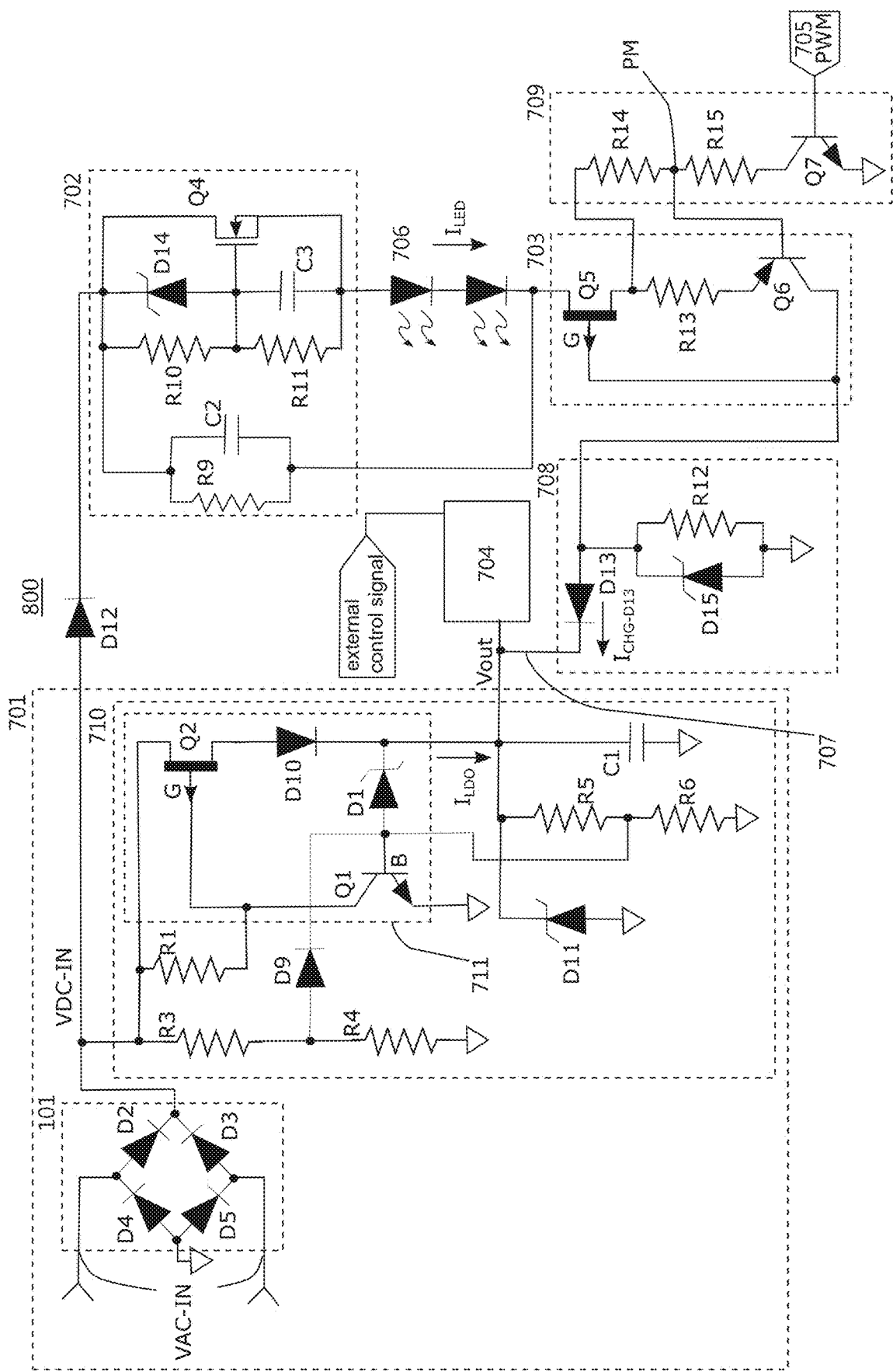
FIG. 8A shows a schematic diagram of a lighting circuit in accordance with another embodiment of the present application.

FIG. 8A shows a lighting circuit 800 in accordance with an embodiment. The lighting circuit 800 includes a voltage converter circuit 701, a flicker reduction circuit 702, a constant current circuit 703, a wireless module 704, and a light source 706. In the lighting circuit 800, the voltage converter circuit 701 has a similar circuit structure to the voltage converter circuit 600. The operation details can be referred to FIG. 6 and the corresponding descriptions. The connecting node Vout can be regarded as a node connecting the wireless module 704 for providing an input power to the wireless module. The DC power VDC-IN supplies power to light source 706 through diode D12 and flicker reduction circuit 702. When the voltage of the DC power VDC-IN is low, the voltage of the connecting node between the light source 706 and the flicker reduction circuit 702 is higher than the voltage of the DC power VDC-IN to cause a current flowing back to DC power DC-IN, which can be prevented by the diode D12.

Flicker reduction circuit 702 includes a filter having a capacitor C2 and the resistor R9 connected in parallel. The filter is electrically connected to the light source 706. The Flicker reduction circuit 702 further includes resistors R10, R11, a capacitor C3, a Zener diode D14, and a transistor Q4. The transistor Q4 can be a HEMT, such as an enhancement-mode HEMT, or a Metal-Oxide-Semiconductor Field-Effect Transistor (MOSFET). The gate voltage of the transistor Q4 is determined by the resistor R10 and the resistor R11 or is determined by the voltage difference of two ends of the Zener diode. The capacitor C3 stores electric charges to stabilize the gate voltage of the transistor Q4. Specifically, the voltage between the resistor R10 and the resistor R11 and the gate voltage of the transistor Q4 are increased when the voltage of the AC input power VAC increases. The voltage difference between the drain and the gate of the transistor Q4 is limited to the breakdown voltage of the Zener diode D14 when the voltage between the resistor R10 and resistor R11 is sufficient to cause the breakdown of the Zener diode D14. The breakdown voltage of the Zener diode D14 is substantially a constant. In other words, the transistor Q4 is operated within a default voltage range and the current flowing through the transistor Q4 is limited within a default current range when the breakdown of the Zener diode D14 is triggered, for example, the difference between the maximum and the minimum of the current flowing through the transistor Q4 is less than 5% of the minimum. With the utilization of the capacitor C3, the variation of the current flowing through the transistor Q4 is further eased, the current flowing through the light source 706 is stabilized, and the flickers due to voltage jitters is avoided.

The enabling condition of the flicker reduction circuit 702 can be altered by changing the resistor R10 or the resistor R11. In the following corresponding description, the AC input power VAC is 110 VAC, an enabling voltage of the light source 706 is 80V, a forward voltage of the light source 706 is 120V, and the breakdown voltage of the Zener diode D14 is 18V. In one embodiment, the resistance of the resistor R10 or the resistor R11 can be determined for the flicker reduction circuit 702 to be enabled when the voltage of the AC input power VAC reaches the sum (98V) of the enabling voltage of the light source 706 (80V) plus the breakdown voltage of the Zener diode D14 (18V). In that case, the breakdown of the Zener diode D14 in the flicker reduction circuit 702 is triggered and the transistor Q4 is turned on so the current flowing through the light source 706 is stabilized and the possible flickers are eased when the voltage of the AC input power VAC reaches the sum (98V). In another embodiment, the transistor Q4 is turned on based on the voltage between the resistor R10 and resistor R11 when the voltage of the AC input power VAC reaches the sum (138V) of the enabling voltage of the light source 706 (120V) plus the breakdown voltage of the Zener diode D14 (18V). In other words, the flicker reduction circuit 702 is enabled when the voltage of the AC input power VAC reaches the sum (138V) of the enabling voltage of the light source 706 (120V) and the breakdown voltage of the Zener diode D14 (18V). On the other hand, with the Zener diode D14, direct influence on light source 706 due to the voltage variation at the drain of the transistor Q4 is suppressed to reduce magnitudes of ripples received by the light source 706 and to avoid abnormal flickers due to the ripples. The flicker reduction circuit 702 can be incorporated into other embodiments. For example, the flicker reduction circuit 702 and one of the voltage converter circuits 100, 200, 300, 400, 500 can be connected, and applied together to a light emitting device. In other words, the flicker reduction circuit 702 and one of the voltage converter circuits 100, 200, 300, 400, 500 can be connected to a light source or a light emitting device to suppress the ripple received by the light source.

In one embodiment, the constant current circuit 703 includes transistors Q5, Q6 and a resistor R13. The charging circuit 708 includes a diode D13, a resistor R12, and a Zener diode D15. The level shifter 709 includes resistors R14, R15 and a transistor Q7. The transistor Q5 can be a HEMT, such as a D-mode HEMT. The transistor Q5 can be a constant current source for light source 706 in the constant current circuit 703. The transistor Q6 can be a bipolar junction transistor (BJT), such as a PNP BJT. The transistor Q7 can be a bipolar junction transistor (BJT), such as an NPN BJT. The base of the transistor Q7 receives the PWM signal 705. The base voltage of the transistor Q6 is lowered by the transistor Q7 so that transistor Q6 is turned on when the voltage of the PWM signal 705 is high (e.g. 3.3V). In that case, the current flowing through the light source 706 and the transistor Q5 further flows through a current path including the transistors Q6, Q7. The current flowing through the transistor Q6 can charge the capacitor C1 or supply power to the wireless module 704 through the diode D13 (charging path 707) and the power factor of the voltage converter circuit 800 is increased. By contrast, when the voltage of the PWM signal 705 is too low to turn on the transistor Q7, e.g. 0V, the transistor Q7 is turned off, and the voltage difference between the base and the emitter of the transistor Q6 is lower than the threshold voltage of the transistor Q6 so the transistor Q6 is not turned on. In that case, the current ILED is almost 0A or it can be regarded as that there is no current flowing through the light source 706 so the light source 706 does not emit light.

FIG. 8B shows the voltage waveform 14 of DC power VDC-IN, the current waveform 16 of the charging current ILDO flowing through the diode D10 and the transistor Q2, the current waveform 19 of the charging current ICHG-D13 and the current waveform 18 of the current ILED flowing through light source 706 in FIG. 8A. FIG. 8B is shown for illustrating the timing relation between the parameters and is not shown for limiting the actual shapes of the waveforms.

Referring to FIG. 8A and FIG. 8B and as FIG. 8B shows, in the time interval between time point t1 and time point t2 and in the time interval between time point t5 and time point t6, the voltage of the DC power VDC-IN is low, and the transistor Q2 in the voltage converter circuit 701 is turned on to generate the charging current ILDO, which is not 0, to charge the capacitor C1 or supply power to the wireless module 704, which is represented by current waveform 16.

When the voltage of DC power VDC-IN is high enough, as FIG. 8B shows, during the voltage crest interval between the time point t3 and time point t4, the light source 706 emits light and the constant current circuit 703 operates. In this embodiment, as current waveform 18 shows, the current ILED is equivalent to a constant current between time point t3 and time point t3, but is not limited thereto while the other embodiments are addressed in the following.

As Current waveform 19 shows, the current value of the charging current ICHG-D13 is not 0 when light source 706 emits light. The charging current ICHG-D13 charges the capacitor C1 of the voltage converter circuit 701 or supplies power to the wireless module 704 to stabilize the output voltage of the connecting node Vout (also the output power). In one embodiment, the voltage of the connecting node Vout or the voltage of the output power is expected to be within a default voltage range. The charging current ICHG-D13 is not larger than the current ILED driving the light source 706 to emit light because a part of the current ILED flows through the Zener diode D15 and does not charge the capacitor C1 or supply power to the wireless module 704 when the output voltage of the connecting node Vout is high enough. In one embodiment, the capacitor C1 supplies power to the wireless module 704 in the situation.

The capacitor C1 supplies power to the wireless module 704 when the voltage of the capacitor C1 is high enough or within a default voltage range during the time interval between time point t2 and time point t3 and the time interval between time point t4 and time point t5.

FIG. 9A shows a packaged integrated circuit MOD in accordance with an embodiment of the present application. FIG. 9B shows a circuit symbol representing the integrated circuit MOD. The circuit symbol in FIG. 9B is denoted with port notations of the integrated circuit MOD in FIG. 9A. The integrated circuit MOD in FIG. 9A is represented by a circuit symbol in FIG. 9B in some circuit diagrams of the drawings for simplicity. The integrated circuit MOD is arranged as a module in form of system in package (SIP). The integrated circuit MOD includes transistors QJ, QB, a diode DD, and a Zener diode DZ connected as shown in FIG. 9A. As shown in FIG. 9A and FIG. 9B, the integrated circuit MOD has an output pin VDD, an input pin VIN, a ground pin GND, a control pin GC, and an adjust pin ADJ for external connection, shown in FIG. 9A and FIG. 9B. The integrated circuit MOD can be incorporated into an LDO or a constant current circuit to simplify the circuit. In one embodiment, the integrated circuit MOD is equivalent to the circuit 711.

Figure 10:
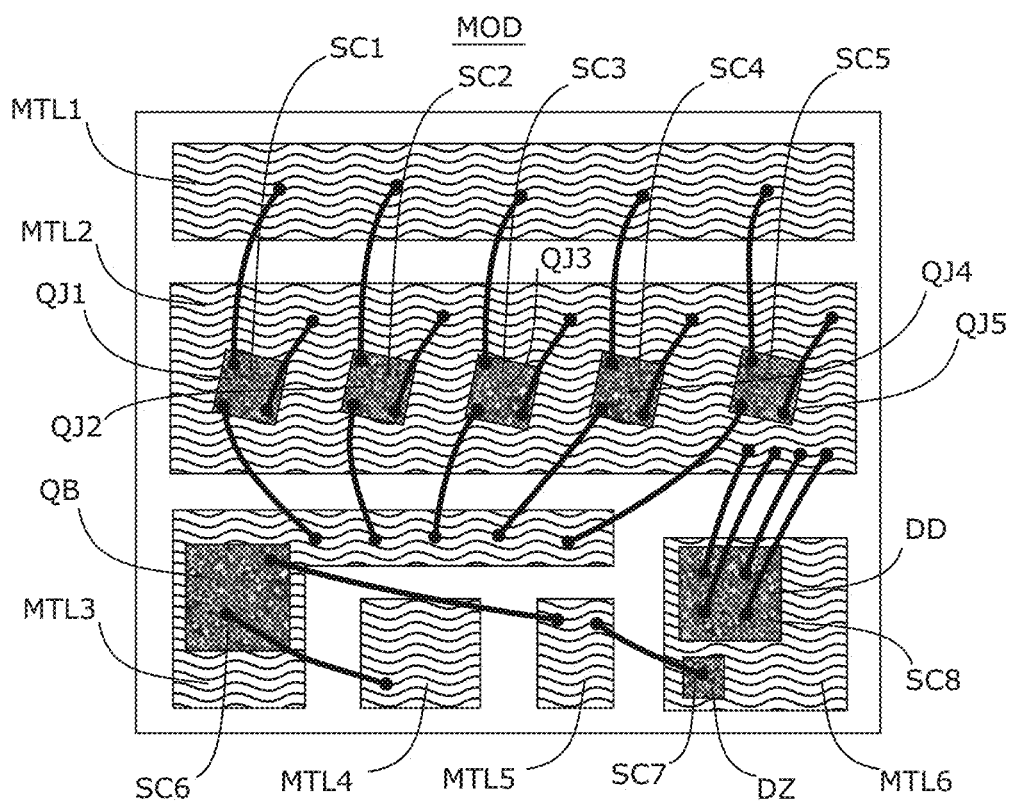
FIG. 10 shows the internal structure of the packaged integrated circuit MOD in accordance with an embodiment of the present application.
Figure 11:
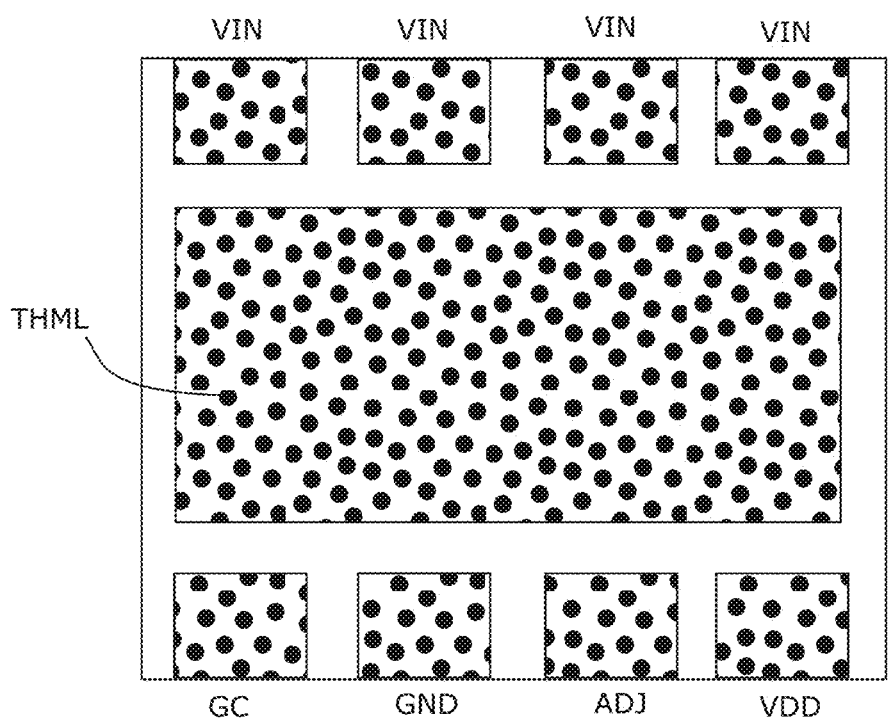
FIG. 11 shows pins layout on the package of the integrated circuit MOD in accordance with an embodiment of the present application.

FIG. 10 shows the internal structure of the packaged integrated circuit MOD in accordance with an embodiment of the present application. FIG. 11 shows pins layout for the package of the integrated circuit MOD in accordance with an embodiment of the present application. For easy comparison, FIG. 10 and FIG. 11 are made in the same perspective. In other words, FIG. 10 and FIG. 11 are both top views to show the two opposite sides of the integrated circuit MOD so FIG. 11 is not a formal bottom view of the integrated circuit MOD and person having skill in the art can understand the placement of the components in the package from FIG. 10 and FIG. 11. The integrated circuit MOD includes metal pads MTL1-MTL6. Each of the transistors QJ, QB, diode DD and the Zener diode DZ is arranged in one single chip and is disposed on a corresponding metal pad. In the embodiment accordance with FIG. 10, integrated circuit MOD includes chips SC1~SC8.

The pad MTL2 carries the transistors QJ1-QJ5. The transistors QJ1-QJ5 are connected in parallel and forms a transistor QJ. Each of the transistors QJ1-QJ5 is in form of one single chip. From another aspect, the transistors QJ1-QJ5 are formed in the chips SC1-SC5 respectively. The chips SC1-SC5 are disposed and adhered on the metal pad MTL2. In one embodiment, the transistors QJ1-QJ5 are D-mode HEMTs, and the transistors QJ1-QJ5 can be transistors of same specification or transistors of different specifications. In other embodiments, the transistor QJ can include two or more transistors subject to the required driving ability of the transistor QJ. The drains of the transistors QJ1-QJ5 are electrically connected to the metal pad MTL1 by wire bonding. The metal pad MTL1 is electrically connected to the input pin VIN at the bottom of the integrated circuit MOD. The gates of the transistors QJ1-QJ5 are electrically connected to the metal pad MTL3 by wire bonding. The metal pad MTL3 is electrically connected to the control pin GC at the bottom of the integrated circuit MOD. The sources of the transistors QJ1-QJ5 are electrically connected to the metal pad MTL2 by wire bonding. The heat generated from the operations of transistors QJ1-QJ5 can be dissipated via the thermal dissipation pin THML under the metal pad MTL2. The thermal dissipation pin THML can be soldered on a printed circuit board.

The MTL3 carries the transistor QB formed in the chip SC6. In one embodiment, the transistor QB is an NPN BJT. The collector of the transistors QB is electrically connected to the metal pad MTL3 by conducting glue. The base of the transistor QB is electrically connected to the metal pad MTL5 by wire bonding and the metal pad MTL5 is electrically connected to the adjust pin ADJ at the bottom of the integrated circuit MOD. The emitter of the transistor QB is electrically connected to the metal pad MTL4 by wire bonding. The metal pad MTL4 is electrically connected to the ground pin GND at the bottom of the integrated circuit MOD.

The metal pad MTL6 carries a diode DD and a Zener diode DZ formed in the chips SC8 and SC7 respectively. The anode of the diode DD is electrically connected to the metal pad MTL2 by wire bonding. The cathode of the diode DD and the cathode of the Zener died DZ are electrically connected to the metal pad MTL2 by conductive glue (not shown in FIG. 10 and FIG. 11). The metal pad MTL2 is electrically connected to the output pin VDD at the bottom of the integrated circuit MOD. The anode of the Zener diode DZ is electrically connected to the metal pad MTL5 by one or more bonding wires.

Figure 12:
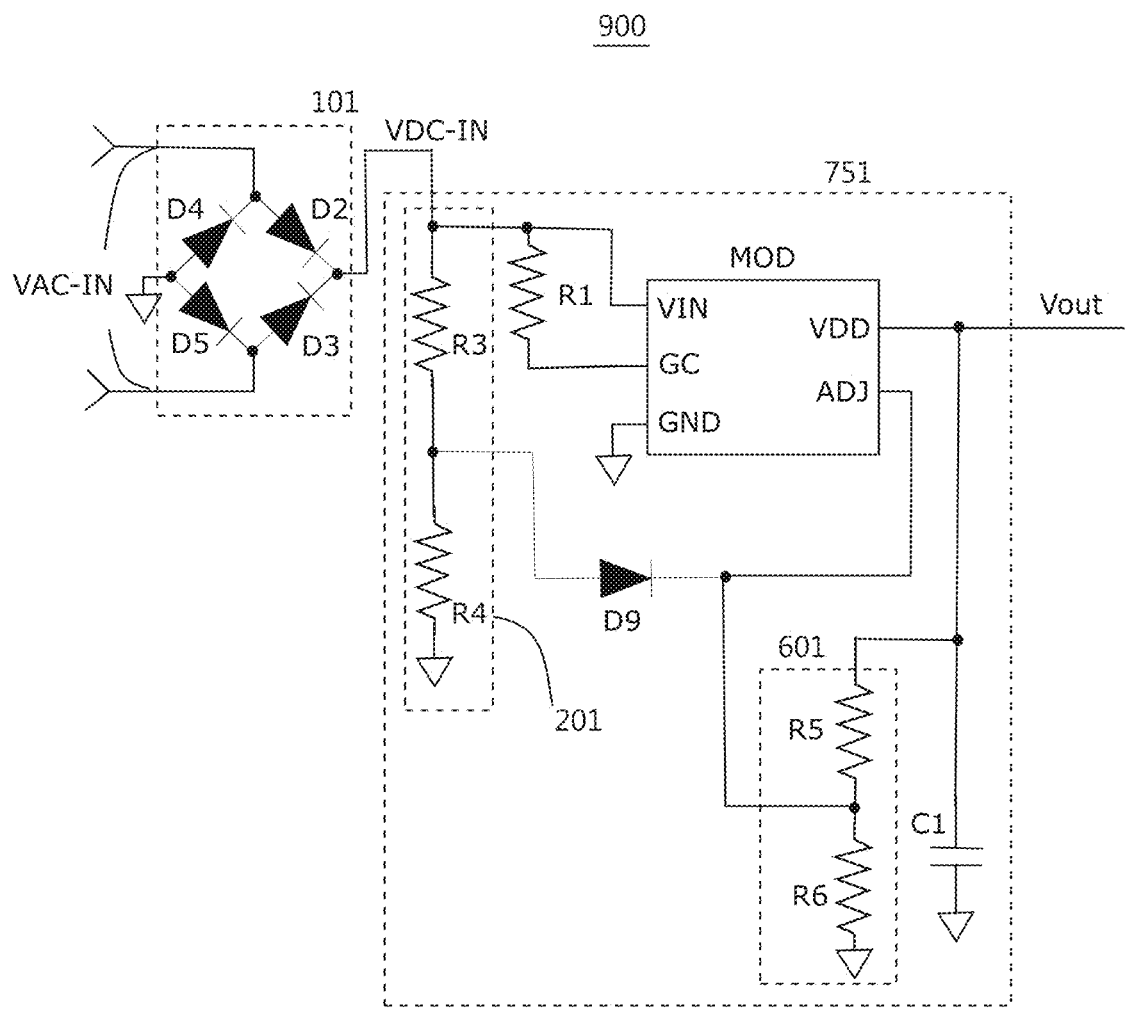
FIG. 12 shows a voltage converter circuit in accordance with further another embodiment of the present application.

FIG. 12 shows a voltage converter circuit in accordance with further another embodiment of the present application. Components, configuration, controls and/or operations the same as or similar to the foregoing embodiments described with respect to FIGS. 1A-11 may be employed in the embodiment of FIG. 12 and detailed explanation thereof may be omitted. The voltage converter circuit 900 includes a bridge rectifier 101 and an LDO 751. The voltage converter circuit 900 includes the integrated circuit MOD. In view of the descriptions and drawings, the voltage converter circuit 900 is equivalent to the voltage converter circuit 600 in FIG. 6. By the utilization of the integrated circuit MOD, the number of the discrete components is reduced.

In the voltage converter circuit 900, the output voltage at the connection node Vout (also the output power) can be determined by the resistance ratio of the resistors R5, R6 in the voltage divider 601, but is not larger than the sum of the breakdown voltage VBDZ plus the base-to-emitter forward voltage of the transistor QB in the integrated circuit MOD. For example, the output voltage of the connecting node Vout is limited to be not larger than 3.6V when the breakdown voltage VBDZ is 2.9V and the base-to-emitter forward voltage is 0.7V.

Figure 13:
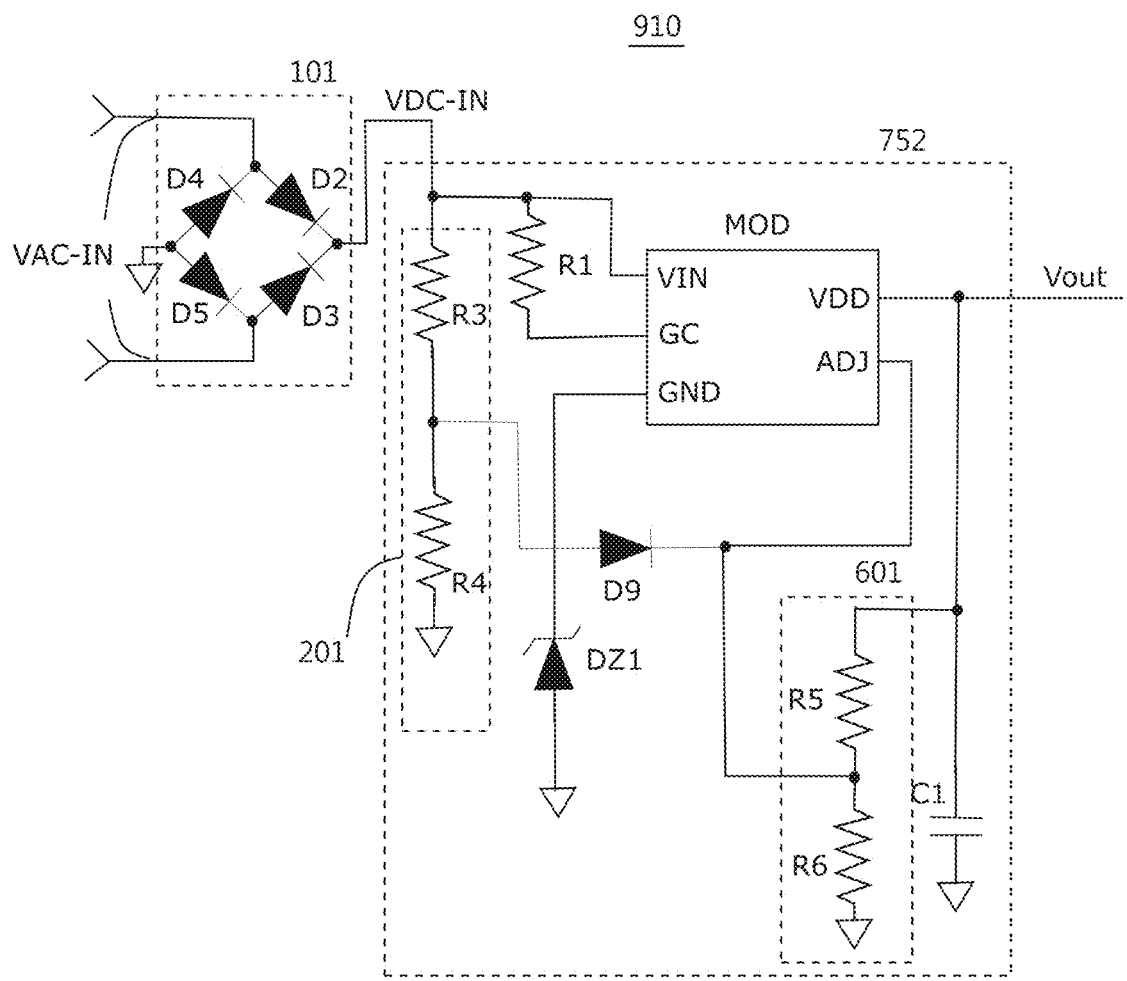
FIG. 13 shows a voltage converter circuit in accordance with further another embodiment of the present application.

In different utilizations, the maximum of the output voltage of the connecting node Vout can be adjusted to be larger than the sum of the breakdown voltage VBDZ of the Zener diode DZ plus the base-to-emitter forward voltage of the transistor QB. FIG. 13 shows a voltage converter circuit in accordance with further another embodiment of the present application. Higher voltage is provided at the connecting node Vout. Components, configuration, controls and/or operations the same as or similar to the foregoing embodiments described with respect to FIGS. 1A-11 may be employed in the embodiment of FIG. 13 and detailed explanation thereof may be omitted. In comparison with FIG. 12, Zener diode DZ1 is added in FIG. 13. The cathode of the Zener diode DZ1 is connected to the ground pin of the integrated circuit MOD and the anode of the Zener diode DZ1 is electrically connected to the ground voltage provided by the bridge rectifier 101. In other words, the ground pin GND of the integrated circuit MOD is electrically connected to the ground voltage via the Zener diode DZ1.

In the LDO 752, the output voltage of the connection node Vout (also the output power) can be determined by the resistance ratio of the resistors R5, R6 in the integrated circuit MOD. The output voltage of the connection node Vout is not larger than the sum of the breakdown voltage VBDZ, the base-to-emitter forward voltage, and the breakdown voltage VBDZ1. For example, the output voltage of the connecting node Vout is limited to be not larger than 43.6V when the breakdown voltage VBDZ is 2.9V, the base-to-emitter forward voltage is 0.7V, and the breakdown voltage VBDZ1 is 40V.

In FIG. 12 and FIG. 13, the voltage divider circuit 201 (including resistors R3, R4), the diode D9, and the corresponding connections perform trough charging. For other embodiments, the voltage divider circuit 201 and the diode D9 can be omitted if the trough charging is not required.

Figure 14:
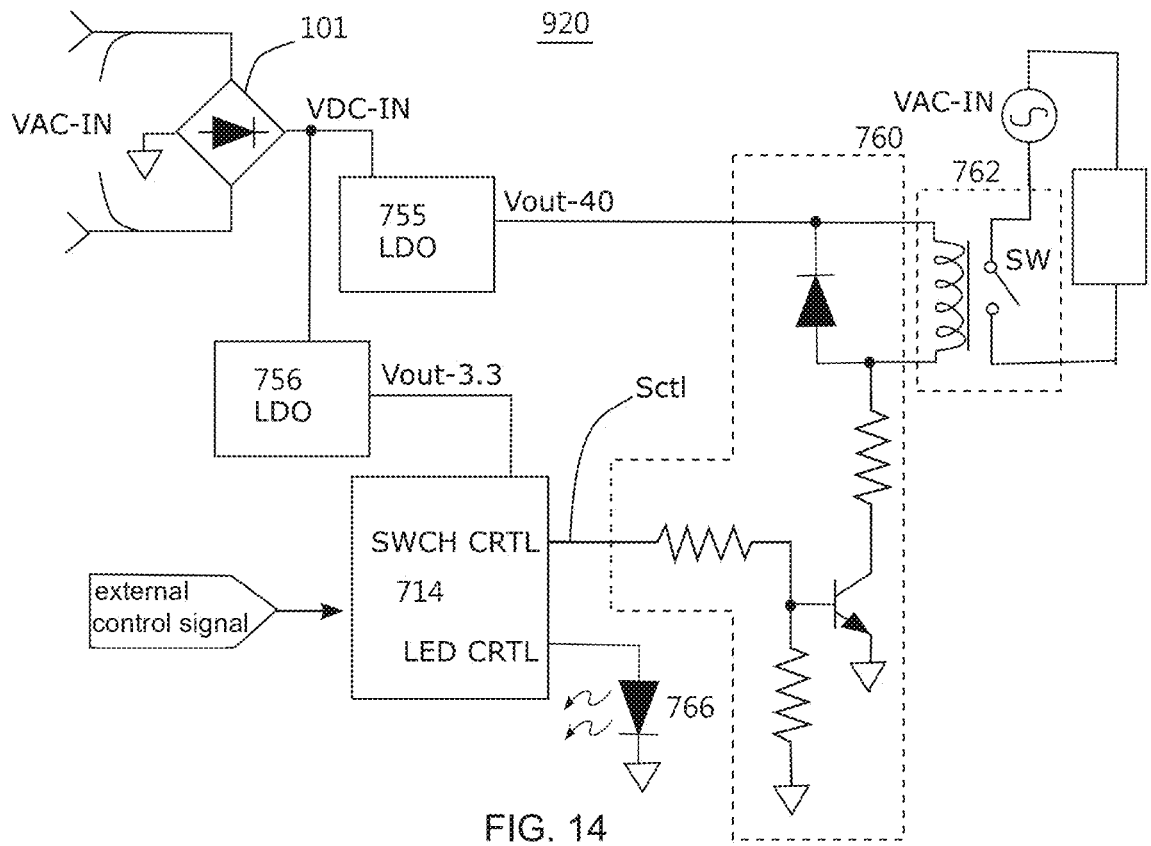
FIG. 14 shows a socket circuit in accordance with an embodiment of the present application.

FIG. 14 shows a socket circuit in accordance with an embodiment of the present application. Socket circuit 920 includes a bridge rectifier 101, LDOs 755, 756, a wireless module 714, a relay 762, and a relay driver 760. The socket circuit 920 achieves wireless controls on load 764 and light source 766.

The bridge rectifier 101 of the socket circuit 920 receives an AC input power VAC-IN supplied by supply mains to generate a DC power VDC-IN and a ground voltage. In one embodiment, the socket circuit 920 includes a socket (not shown in the drawings) which can electrically connect to a load 764 or the light source 766 through one or more external plugs. For example, the load 764 can be an oven and the light source 766 can be a LED lamp. A wireless signal provided from a mobile phone can indicate whether to turn on the light source 766 or establish an electrical connection between the load 764 and a power source through the socket circuit 920.

The LDOs 755, 756 can be in the form of the previous LDOs or voltage converter circuits, but not limited hereto. The LDOs 755, 756 utilize the DC power VDC-IN as an input power. The LDO 755 provides an output power with a maximum voltage of about 40V (RMS voltage) at a connecting node Vout-40 (also the output end of the LDO 755) based on the AC input power VAC-IN. The LDO 756 is provides an output power with about 3.3V (RMS voltage) at a connecting node Vout-3.3 (also the output end of the LDO 756) based on the AC input power VAC-IN.

In one embodiment, the wireless module 714 is a Bluetooth module or a WIFI module and receives an external control signal from mobile device. The external control signal can be a wireless signal. The wireless module 714 utilizes the 3.3V output voltage at the connecting node Vout-3.3 as an input power and determines whether to turn on the light source 706 according to the external control signal. The wireless module 714 can generate a control signal Sct1 according to an external control signal to instruct whether to turn on a switch SW of the relay 762 by relay driving circuit 760. In this embodiment, the switch SW of the relay 762 is turned on when the control signal Sct1 is 3.3V while the switch SW of the relay 762 is turned off when the control signal Sct1 is 0V.

The relay driver circuit 760 and the relay 762 utilize the output power having a 40V output voltage at the connecting node Vout-40 as input power.

In FIG. 14, the AC input power VAC-IN is electrically connected to the load 764 via the socket circuit 920 to supply power to the load 764 when the switch SW of the relay 762 is turned on. The AC input power VAC-IN is not electrically connected to the load 764 by the socket circuit 920 and does not supply power to the load 764 when the switch SW of the relay 762 is turned off.

In other embodiments, the switch SW of the relay 762 in FIG. 14 is controlled to establish or to disconnect the electrical connection between a battery power and the load 764.

Figure 15:
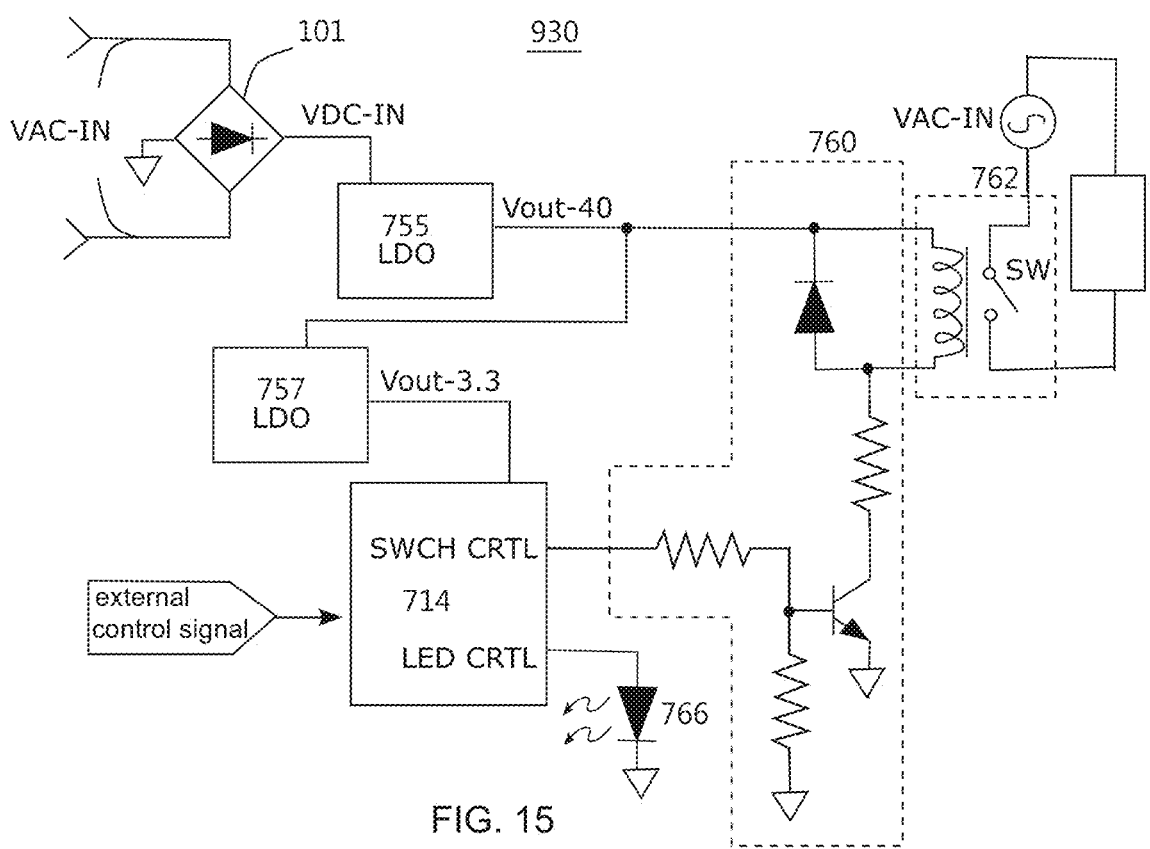
FIG. 15 shows a socket circuit in accordance with another embodiment of the present application.

FIG. 15 shows a socket circuit in accordance with another embodiment of the present application. Components, configuration, controls and/or operations the same as or similar to the foregoing embodiments described with respect to FIGS. 1A-14 may be employed in the embodiment of FIG. 15, and detailed explanation thereof may be omitted.

Being different from the LDO 756 of the socket circuit 920 in FIG. 14, the LDO 757 of the socket circuit 930 in FIG. 15 utilizes the output power having a 40V output voltage at the connecting node Vout-40 as an input power to generate another output power having a 3.3V voltage at the connecting node Vout-3.3. The output power generated by the LDO 757 serves as an input power to the wireless module 714.

To be brief, the LDO 755 of socket circuit 930 converts the unstable DC power VDC-IN and provides a stabilized mid-power having a 40V voltage at the connecting node Vout-40 for supplying power to the relay driver circuit 760 and the relay 762. The LDO 757 converts the mid-power and provides a low power having a 3.3V voltage at the connecting node Vout-3.3. The low power is further stabilized so malfunction of wireless module 714 is prevented.

Figure 16:
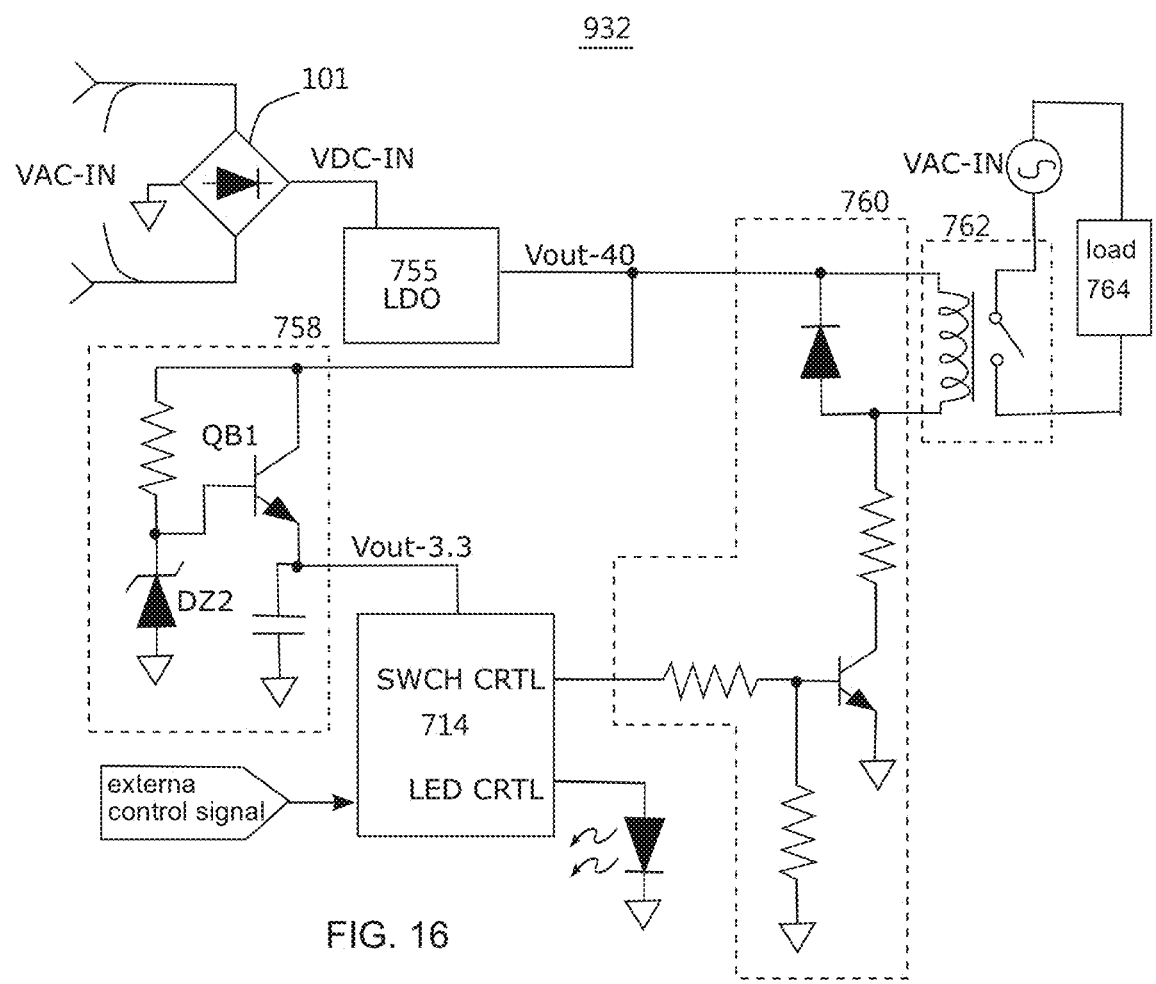
FIG. 16 shows a socket circuit in accordance with further another embodiment of the present application.

FIG. 16 shows a socket circuit in accordance with further another embodiment of the present application. Components, configuration, controls and/or operations the same as or similar to the foregoing embodiments described with respect to FIGS. 1A-15 may be employed in the embodiment of FIG. 16, and detailed explanation thereof may be omitted. In a socket circuit 932, an LDO 758 is a substitute for the LDO 757 in the FIG. 15. For example, the breakdown voltage VBDZ2 of Zener diode DZ2 is about 4V and the base-to-emitter forward voltage of the transistor QB1 is about 0.7V so the output voltage on the connecting node Vout-3.3 of the LDO 758 can be approximately limited at 3.3V (4V–0.7V).

Figure 17:
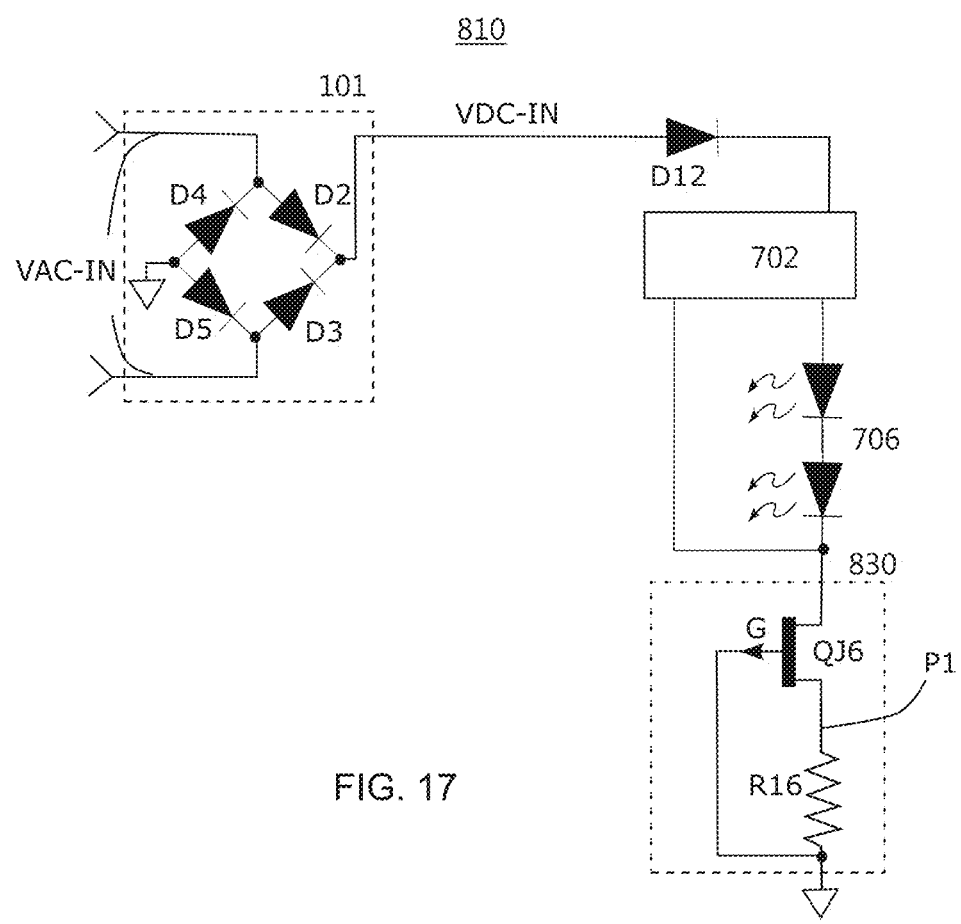
FIG. 17 shows a schematic diagram of a lighting circuit in accordance with an embodiment of the present application.

FIG. 17 shows a schematic diagram of a lighting circuit in accordance with an embodiment of the present application. Components, configuration, controls and/or operations the same as or similar to the foregoing embodiments described with respect to FIGS. 1A-16 may be employed in the embodiment of FIG. 17, and detailed explanation thereof may be omitted. The lighting circuit 810 includes a constant current circuit 830 connected between the light source 706 and a ground voltage provided by the bridge rectifier 101. The constant current circuit 830 controls the current flowing through the light source 706.

The constant current circuit 830 includes a transistor QJ6 and a resistor R16 connected as shown in FIG. 17. The transistor QJ6 can be a HEMT, such as a D-mode HEMT. If the threshold voltage of the transistor QJ6 is $-Vth_{QJ6}$, the voltage of the connecting node P1 is maintained at about the voltage $Vth_{QJ6}$ and the current flowing through the resistor R16 is maintained at about $Vth_{QJ6}/R16$ (R16 also represents the resistance of the resistor R16) when the voltage of the DC power VDC-IN is high enough to drive the light source 706 to emit light. In that case, the current flowing through the light source 706 has an approximately constant current value when the voltage of the connecting node P1 is maintained at about $Vth_{QJ6}$ so the constant current control is achieved.

FIG. 17 shows a schematic diagram of a lighting circuit in accordance with an embodiment of the present application. For the lighting circuit 810, power consumption may vary with the variation of the AC input power VAC-IN. For example, a lighting period of the light source 706 within a cycle of an AC input power VAC-IN with 230 VAC is longer than another lighting period of the light source 706 within a cycle of another AC input power VAC-IN with 110 VAC. Therefore, lighting circuit 810 may have higher power consumption and luminous intensity with an AC input power supplying 230 VAC than those with an AC input power supplying 110 VAC. In other words, the actual power consumption may not be 11 watts as assumed when an LED bulb with rated power of 11 watts is adapted in the lighting circuit 810 because the power consumption of the lighting circuit 810 varies with adaptions of the different AC input power VAC-IN having different rated powers.

Figure 18A:
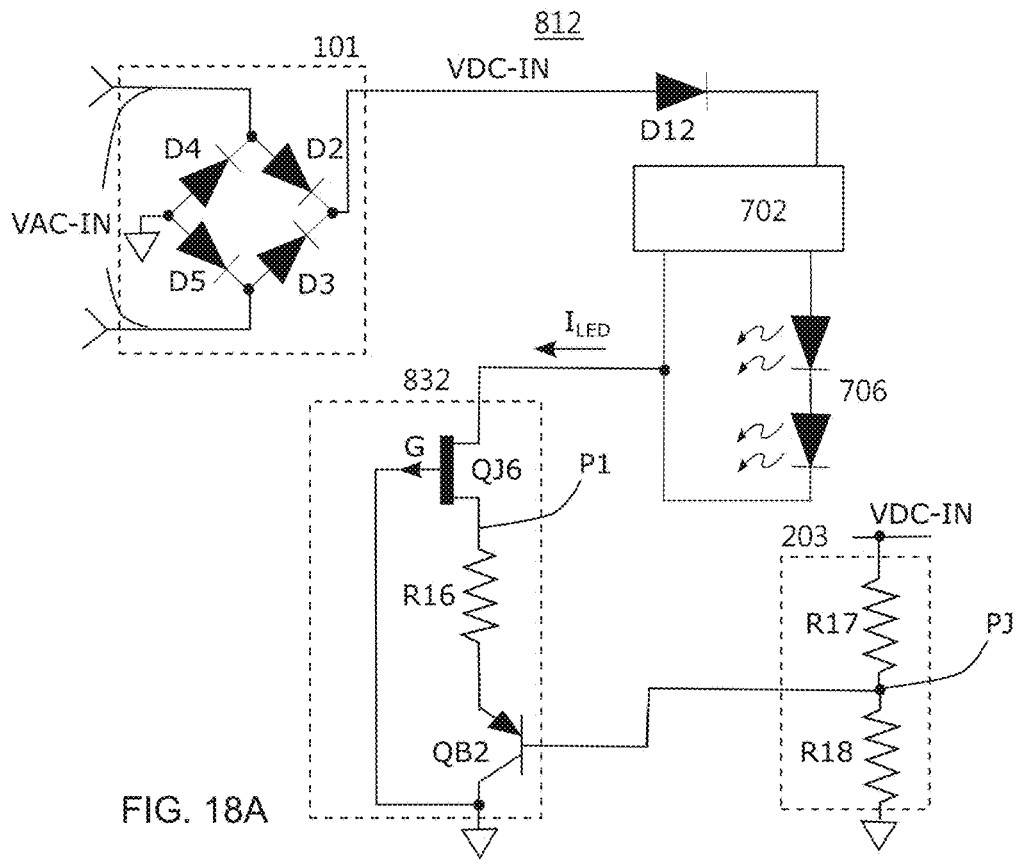
FIG. 18A shows a schematic diagram of a constant power lighting circuit in accordance with an embodiment of the present application.

FIG. 18A shows a schematic diagram of a constant lighting circuit in accordance with an embodiment of the present application. In this embodiment, the luminous intensity and the power consumption of the light source 706 are approximately constant values respectively and do not vary with the RMS voltage variation of the AC input power. The RMS voltage may be exemplary 110V or 220V, but is not limited thereto. Components, configuration, controls and/or operations the same as or similar to the foregoing embodiments described with respect to FIGS. 1A-17 may be employed in the embodiment of FIG. 18A, and detailed explanation thereof may be omitted.

The lighting circuit 812 includes a controllable constant current circuit 832 and a voltage divider circuit 203. The controllable constant current circuit 832 includes a transistor QB2. The transistor QB2 can be a PNP BJT connected between a resistor R16 and a ground voltage. The base of the transistor QB2 serves as a control end. The voltage divider circuit 203 includes resistors R17, R18 serially connected between the DC power VDC and the ground voltage. A connecting node PJ between the resistors R17, R18 is connected to the base of the transistor QB2. The voltage VPJ of the connecting node PJ is increased accordingly when the DC power VDC-IN is increased and the emitter voltage $V_{E-QB2}$ of the transistor QB2 is increased. As aforementioned, the voltage of the connecting node P1 is maintained at about the voltage $Vth_{QJ6}$ when the voltage of the DC power VDC-IN is high enough. Thus, the current flowing through the resistor R16 is approximately the current ILED flowing through the light source 706 and has a current value substantially satisfying the equation of $(Vth_{QJ6}-V_{E-QB2})/R16$. The emitter voltage is increased with the increase of the DC power VDC-IN. In other words, the voltage VPJ is increased and the controllable constant current circuit 832 decreases the current ILED when the voltage of the DC power VDC-IN is increased.

Figure 18C:
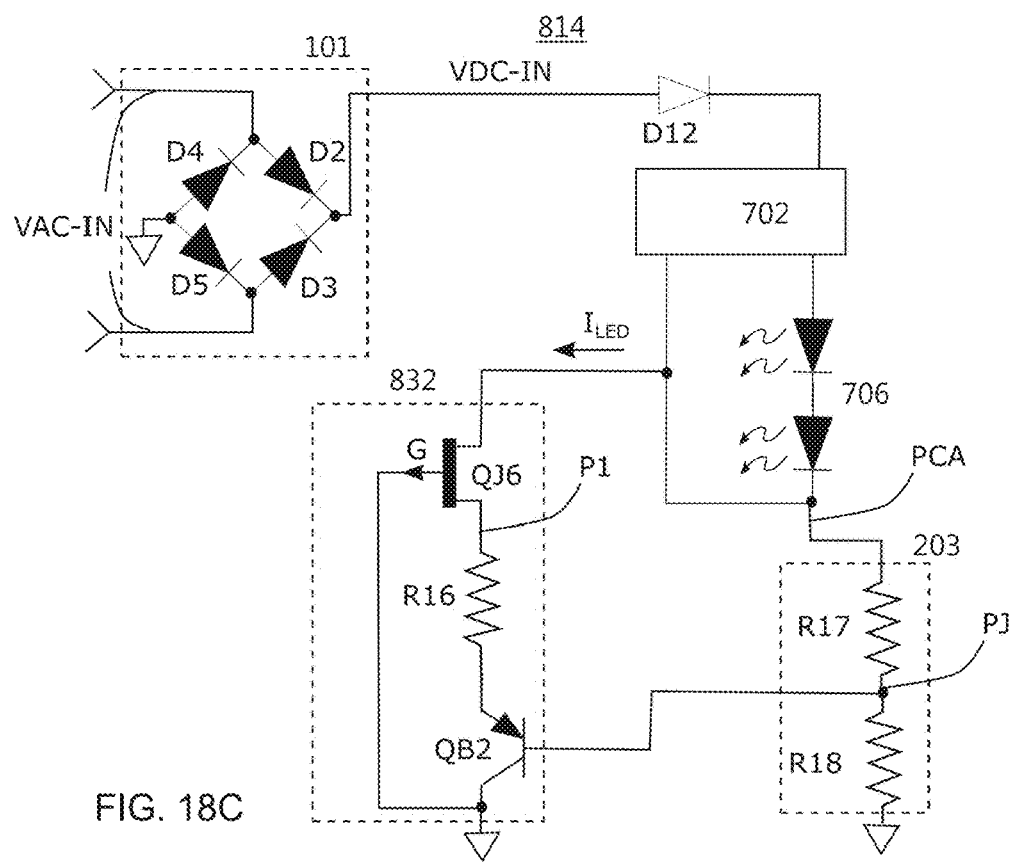
FIG. 18C shows a schematic diagram of a constant power lighting circuit in accordance with another embodiment of the present application.
Figure 18B:
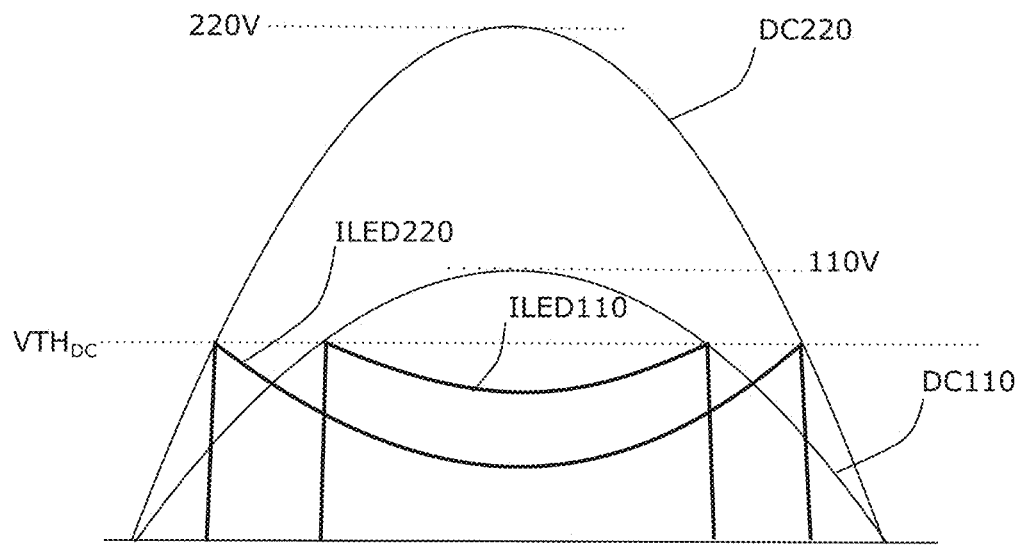
FIG. 18B shows a voltage waveform DC110, a voltage waveform DC220, a current waveform ILED110, and a current waveform ILED220 of the circuit shown in FIG. 18A.

FIG. 18B shows current waveform ILED110 and voltage waveform DC110 when the AC power supplies RMS voltage 110V and shows current waveform ILED220 and voltage waveform DC220 when the AC power supplies RMS voltage 220V in accordance with an embodiment of the present application. In FIG. 18B, it is supposed that the light source starts to emit light when the DC power DC-IN exceeds the threshold voltage VTHDC and the current ILED is controlled by the controllable constant current circuit 832. The power consumption of the constant lighting circuit 812 may be approximately proportional to the area under the current waveform ILED in the FIG. 18B. By FIG. 18B, the area covered by the current waveform ILED220 is wider than the area covered by the current waveform ILED110, but a part of the area covered by the current waveform ILED220 is lower than a part of the area covered by the current waveform ILED110. Based on the schematic in FIG. 18A, with appropriate components for setting the threshold VTHDC, the area covered by the current waveform ILED220 can be approximately equal to the area covered by the current waveform ILED110. In other words, the power consumptions with AC input power of 110 VAC or with AC input power of 220 VAC are approximately the same and constant power consumption is achieved.

FIG. 18C shows a schematic diagram of a constant lighting circuit in accordance with another embodiment of the present application. The luminous intensity and the power consumption of the lighting circuit 814 is not affected by rated power variation with different AC input powers. Components, configuration, controls and/or operations the same as or similar to the foregoing embodiments described with respect to FIGS. 1A-18B may be employed in the embodiment of FIG. 18C, and detailed explanation thereof may be omitted.

Being different from the lighting circuit 812 in FIG. 18A, the voltage divider circuit 203 in the lighting circuit 814 is connected between the connecting node PCA and the ground voltage. The connecting node PCA is connected to the controllable constant current circuit 832 and the light source 706. The voltage of the connecting node PCA can approximately indicate the voltage of DC power VDC-IN. Therefore, the voltage of the connecting node PCA may be increased when the voltage of the DC power VDC-IN is increased. The voltage VPJ of the connecting node PJ is increased with the voltage of the connecting node PCA, and thus the current ILED flowing through the light source 706 is reduced. As a result, the power consumption of lighting circuit 814 does not vary with the adaptions of AC powers with different RMS voltage and is approximately a constant.

Figure 19A:
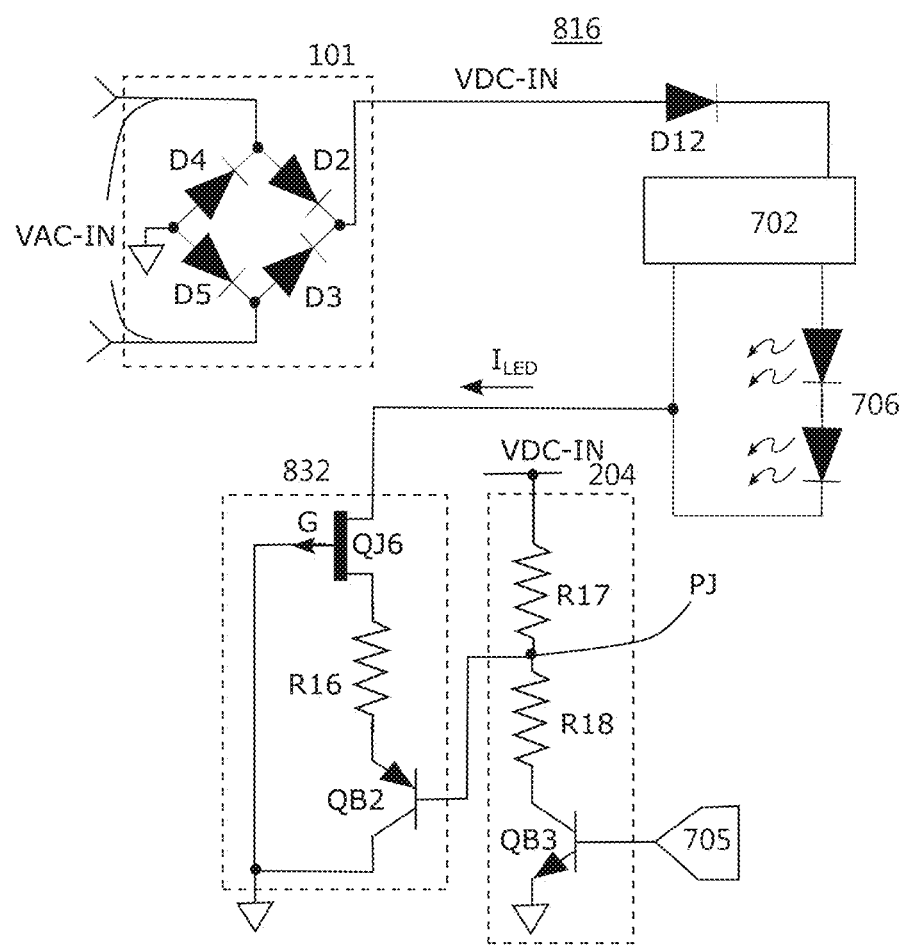
FIG. 19A shows a schematic diagram of a dimmable lighting circuit in accordance with an embodiment of the present application.

The constant power control can be integrated with dimming control. FIG. 19A shows a schematic diagram of a dimmable lighting circuit in accordance with an embodiment of the present application. Components, configuration, controls and/or operations the same as or similar to the foregoing embodiments described with respect to FIGS. 1A-18C may be employed in the embodiment of FIG. 19A, and detailed explanation thereof may be omitted.

In the lighting circuit 816, the dimming and power control integrated circuit 204 includes resistors R17, R18 and a transistor QB3. The transistor QB3 is an NPN BJT. The dimming and power control integrated circuit 204 is electrically connected between the DC power VDC-IN and the ground voltage. The dimming and power control integrated circuit 204 receives the PWM signal 705 (dimming signal) and controls the base voltage of the transistor QB2 according to the PWM signal 705. The transistor QB3 is turned on and the resistor R18 is conducted to the ground voltage when the PWM signal represent a logic "1". In that case, the dimming and power control integrated circuit 204 is equivalent to the voltage divider circuit 203 in FIG. 18A. The transistor QB3 is turned off so the connection between the resistor R18 and the ground voltage is electrically open when the PWM signal represent a logic "0". Therefore, the voltage of the connecting node PJ is approximately equal to the voltage of the DC power VDC-IN so the transistor QB2 is turned off which leads to no current flowing through the resistor R16, the current ILED flowing through the light source 706 is about OA, and the light source does not emit light. According to the abovementioned, the PWM signal 705 can control the light source 706 to emit light or not and can be regarded as a dimming signal. The "turn on" and "turn off" is corresponding to the equivalent impedance between two ends (drain and source, or collector and emitter) of a transistor and is corresponding to the design of the whole circuit and are worth reasonable interpretations by the skilled in the art.

Figure 19B:
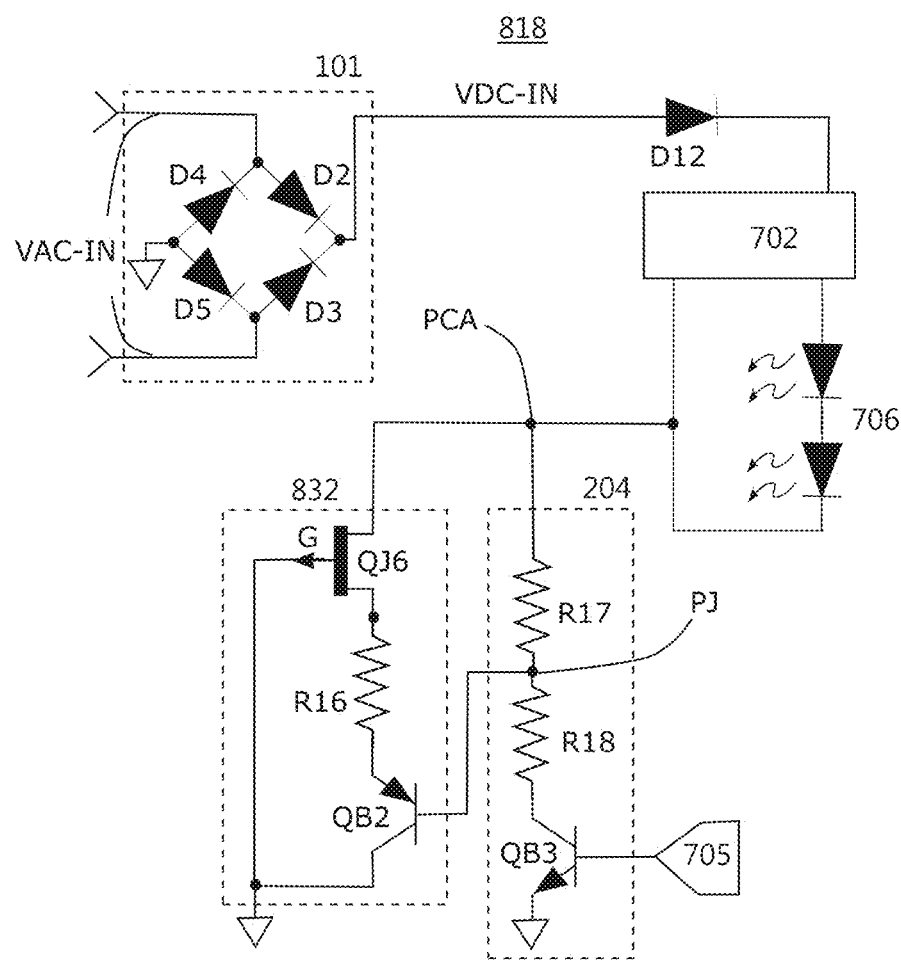
FIG. 19B shows a schematic diagram of a dimmable lighting circuit in accordance with another embodiment of the present application.

FIG. 19B shows a schematic diagram of a dimmable lighting circuit in accordance with another embodiment of the present application. Components, configuration, controls and/or operations the same as or similar to the foregoing embodiments described with respect to FIGS. 1A-19A may be employed in the embodiment of FIG. 19B, and detailed explanation thereof may be omitted. Being different from the dimming and power control integrated circuit 204 in FIG. 19A, one end of the dimming and power control integrated circuit 204 in FIG. 19B is electrically connected to the connecting node PCA and another end is electrically connected to the ground voltage. With the teachings from FIGS. 18A, 18C, 19A, the lighting circuit 818 can also provide constant power control and dimming control.

Figure 20:
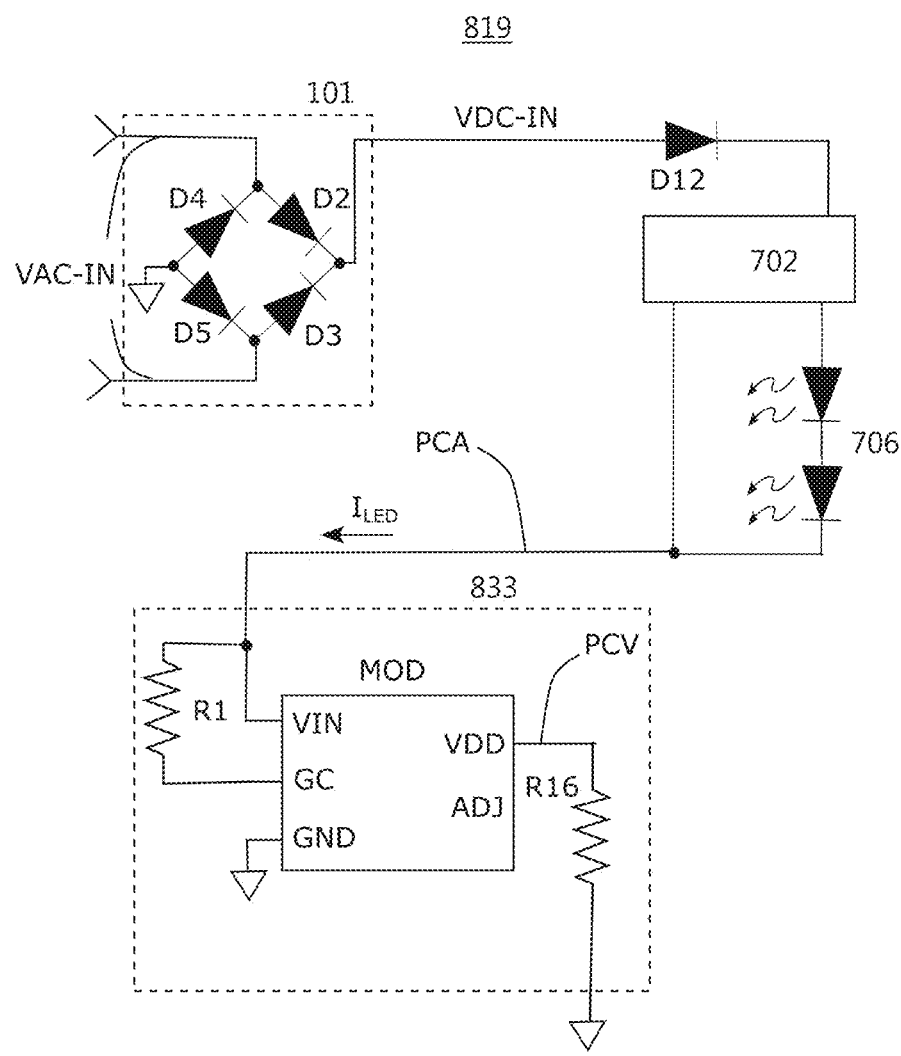
FIG. 20 shows a schematic diagram of a lighting circuit in accordance with an embodiment of the present application.

FIG. 20 shows a schematic diagram of a lighting circuit in accordance with an embodiment of the present application. Components, configuration, controls and/or operations the same as or similar to the foregoing embodiments described with respect to FIGS. 1A-19B may be employed in the embodiment of FIG. 20, and detailed explanation thereof may be omitted.

The constant current circuit 833 is connected between the light source 706 and the ground voltage and includes one integrated circuit MOD shown in FIG. 9A and FIG. 9B. As shown in FIG. 20, in the constant current circuit 833, a resistor R1 is connected between the control pin GC and the input pin VIN of the integrated circuit MOD. The output pin VDD serves as the connecting node PCV. A resistor R16 is connected between the connecting node PCV and the ground voltage. The input pin VIN is connected to the light source 706 through the connecting node PCA. The ground pin GND is connected to the ground voltage. The adjusted pin ADJ is floating. In this embodiment, the adjust pin ADJ is not connected to other circuits or components.

As the teachings in the aforementioned, the voltage VCV of the connecting node PCV is approximately maintained at a sum of the breakdown voltage VBDZ of the Zener diode DZ in the integrated circuit MOD plus the base-to-emitter forward voltage of the transistor QB when the voltage provided by the AC input power VAC-IN is larger than a default value. The current flowing through the resistor R16 is approximately maintained at the value of VCV/R16 and is approximately a constant value. The current flowing through the resistor R16 is approximately the current ILED flowing through light source 706 so the constant current circuit 833 provides a current having a current value near constant of VCV/R16 for driving the light source 706.

Figure 21A:
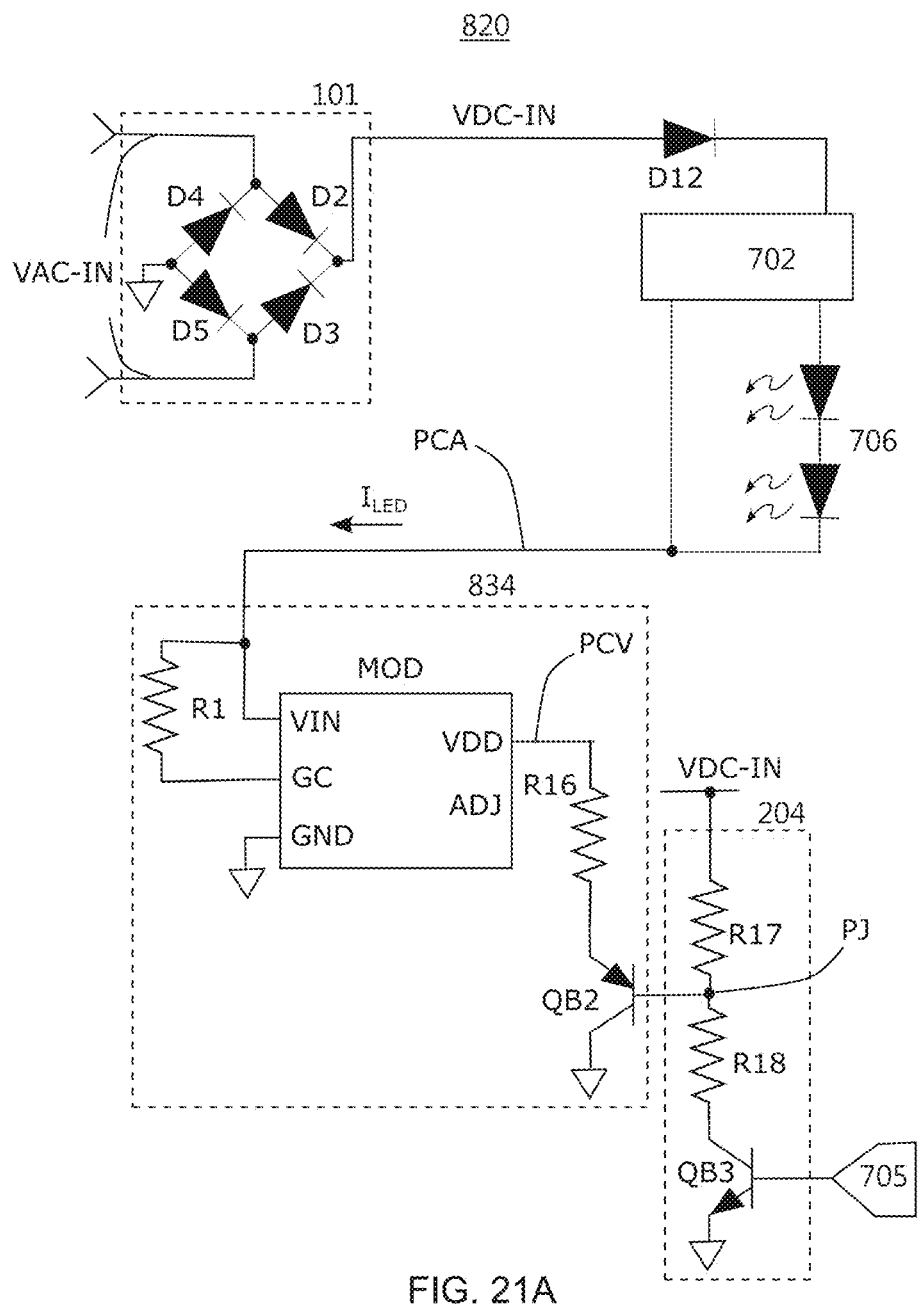
FIG. 21A shows a schematic diagram of a dimmable lighting circuit in accordance with further another embodiment of the present application.

FIG. 21A shows a schematic diagram of a dimmable lighting circuit in accordance with further another embodiment of the present application. Components, configuration, controls and/or operations the same as or similar to the foregoing embodiments described with respect to FIGS. 1A-20 may be employed in the embodiment of FIG. 21A, and detailed explanation thereof may be omitted. The lighting circuit 820 performs dimming and constant power control.

In the lighting circuit 820, controllable constant current circuit 834 includes a transistor QB2 connected between a resistor R16 and a ground voltage. The dimming and power control integrated circuit 204 is electrically connected between the DC power and the ground voltage. The dimming and power control integrated circuit 204 receives the PWM signal 705 and controls the base voltage of the transistor QB2 accordingly. In the lighting circuit 820, the controls on the controllable constant current circuit 834 and the dimming and power control integrated circuit 204 can be referred to the previous embodiments and are not repeated herein.

Figure 21B:
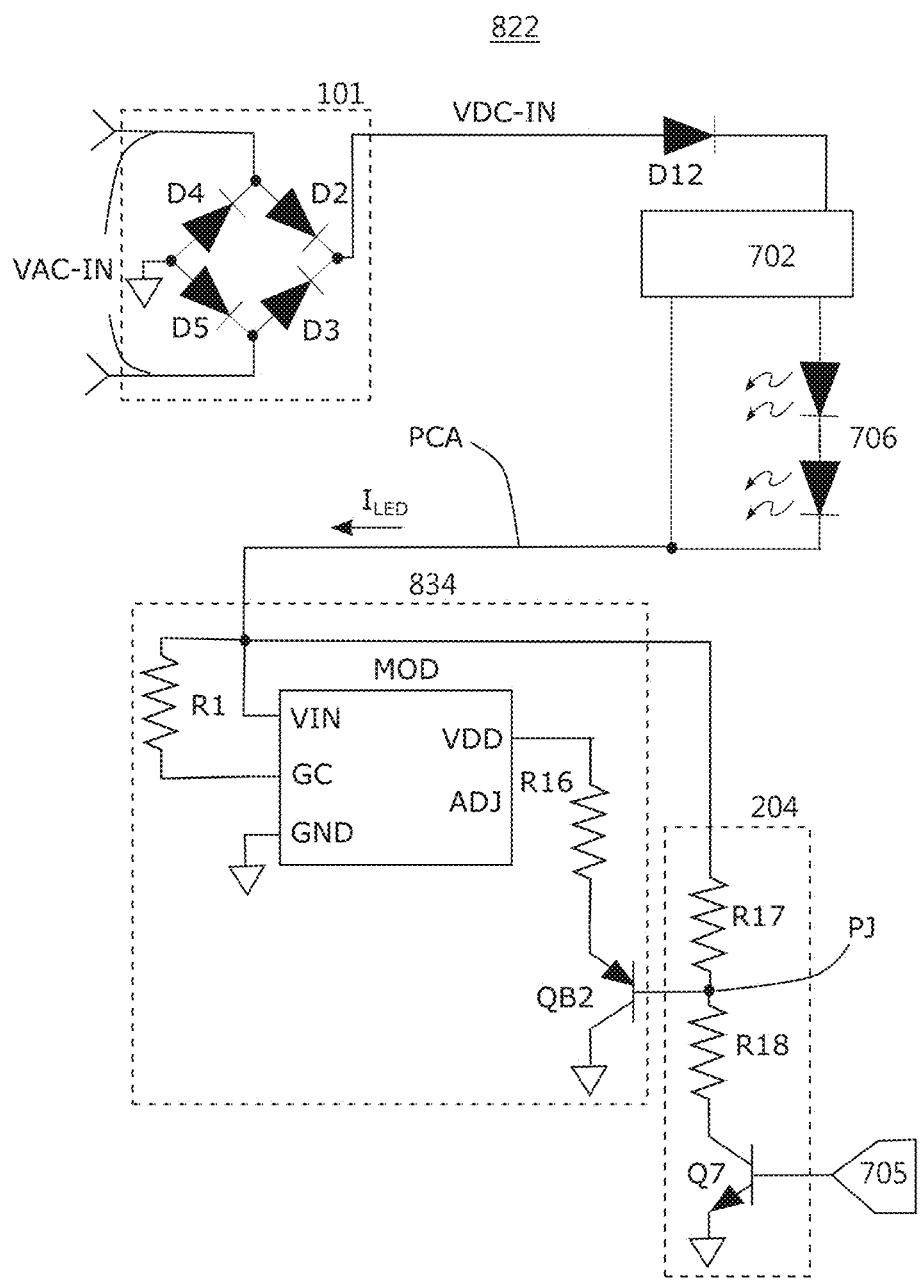
FIG. 21B shows a schematic diagram of a dimmable lighting circuit in accordance with further another embodiment of the present application.

FIG. 21B shows a schematic diagram of a dimmable lighting circuit in accordance with further another embodiment of the present application. Components, configuration, controls and/or operations the same as or similar to the foregoing embodiments described with respect to FIGS. 1A-21A may be employed in the embodiment of FIG. 21B, and detailed explanation thereof may be omitted. The lighting circuit 822 performs dimming and constant power control. In the lighting circuit 822, the control between controllable constant current circuit 834 and dimming and power control integrated circuit 204 can be referred to the previous embodiments and are not repeated herein.

Figure 22A:
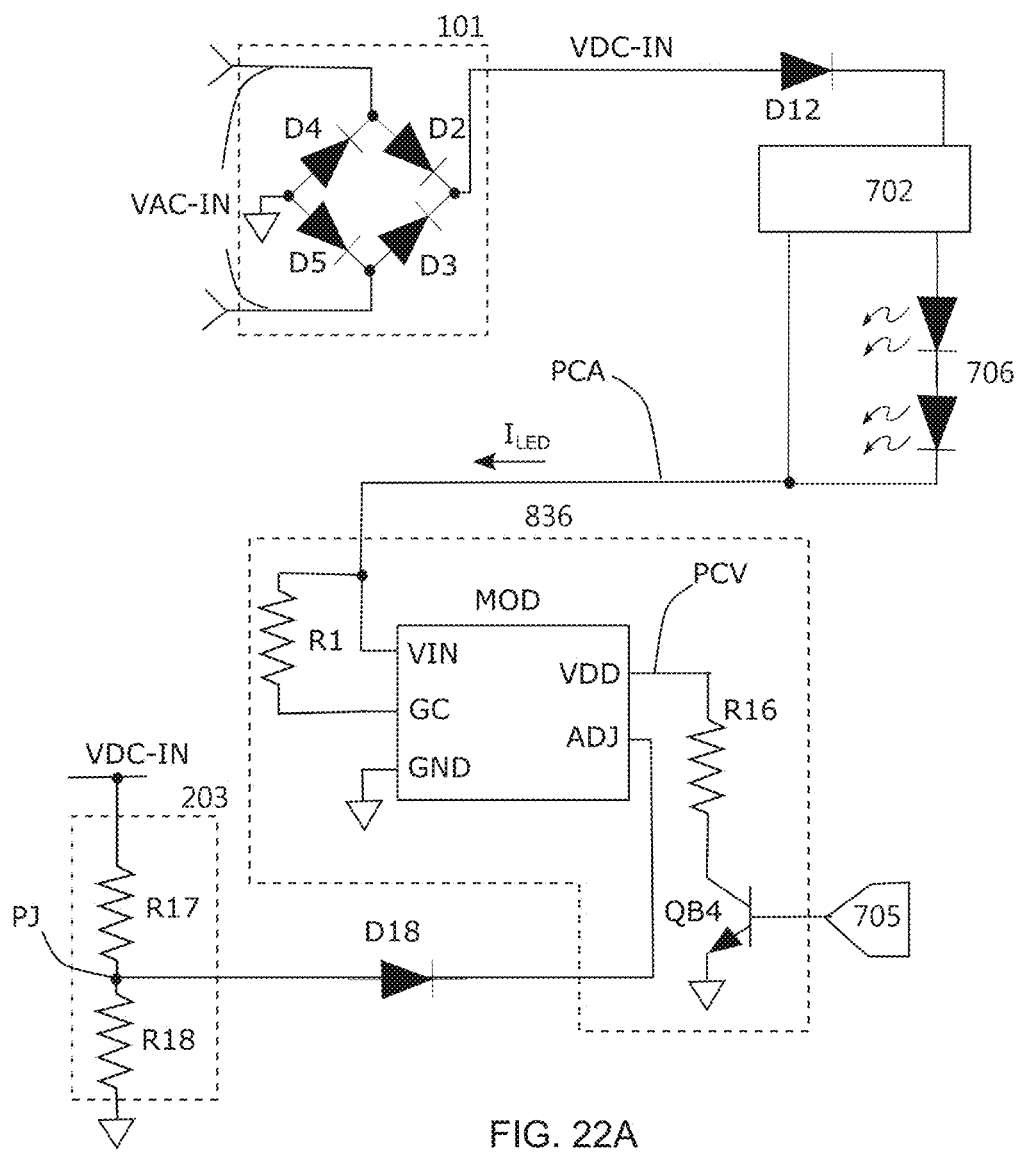
FIG. 22A shows a schematic diagram of a dimmable lighting circuit in accordance with further another embodiment of the present application.

FIG. 22A shows a schematic diagram of a dimmable lighting circuit in accordance with further another embodiment of the present application. Components, configuration, controls and/or operations the same as or similar to the foregoing embodiments described with respect to FIGS. 1A-21B may be employed in the embodiment of FIG. 22A, and detailed explanation thereof may be omitted. The lighting circuit 824 has functions of dimming and constant power control.

In the lighting circuit 824, the controllable constant current circuit 836 includes a transistor QB4 connected between the resistor R16 and a ground voltage. The transistor QB4 can be an NPN transistor. The transistor QB4 has a base receiving a PWM signal 705. The PWM signal 705 instructs the controllable constant current circuit 836 to adjust the current ILED for dimming control. The transistor QB4 is turned on and provides a voltage near the ground voltage to the resistor R16 when the PWM has a high voltage representing a logic "1". In that case, the equivalent resistance between the connecting node PCV and the ground voltage is about the resistance of the resistor R16. The controllable constant current circuit 836 provides a current ILED having current value of VCV/R16 for driving the light source 706. The transistor QB4 is turned off and an electric connection between the resistor R16 and the ground voltage is disconnected. Therefore, the equivalent resistance between the connecting node PCV and the ground voltage can be regarded as being near positive infinity and the current ILED is about OA.

The lighting circuit 824 includes a voltage divides circuit 203. The voltage divider circuit 203 includes resistors R17 and R18 serially connected between the DC power VDC-IN and the ground voltage. The connecting node PJ between the resistor R17 and the resistor R18 is electrically connected to the adjust pin ADJ of the integrated circuit MOD through the diode D18. When the voltage of the DC power VDC-IN is higher than a default value, the voltage of the connecting node PJ instructs the controllable constant current circuit 836 to decrease the current ILED through the adjust pin ADJ. Thus, constant power control is achieved.

Figure 22B:
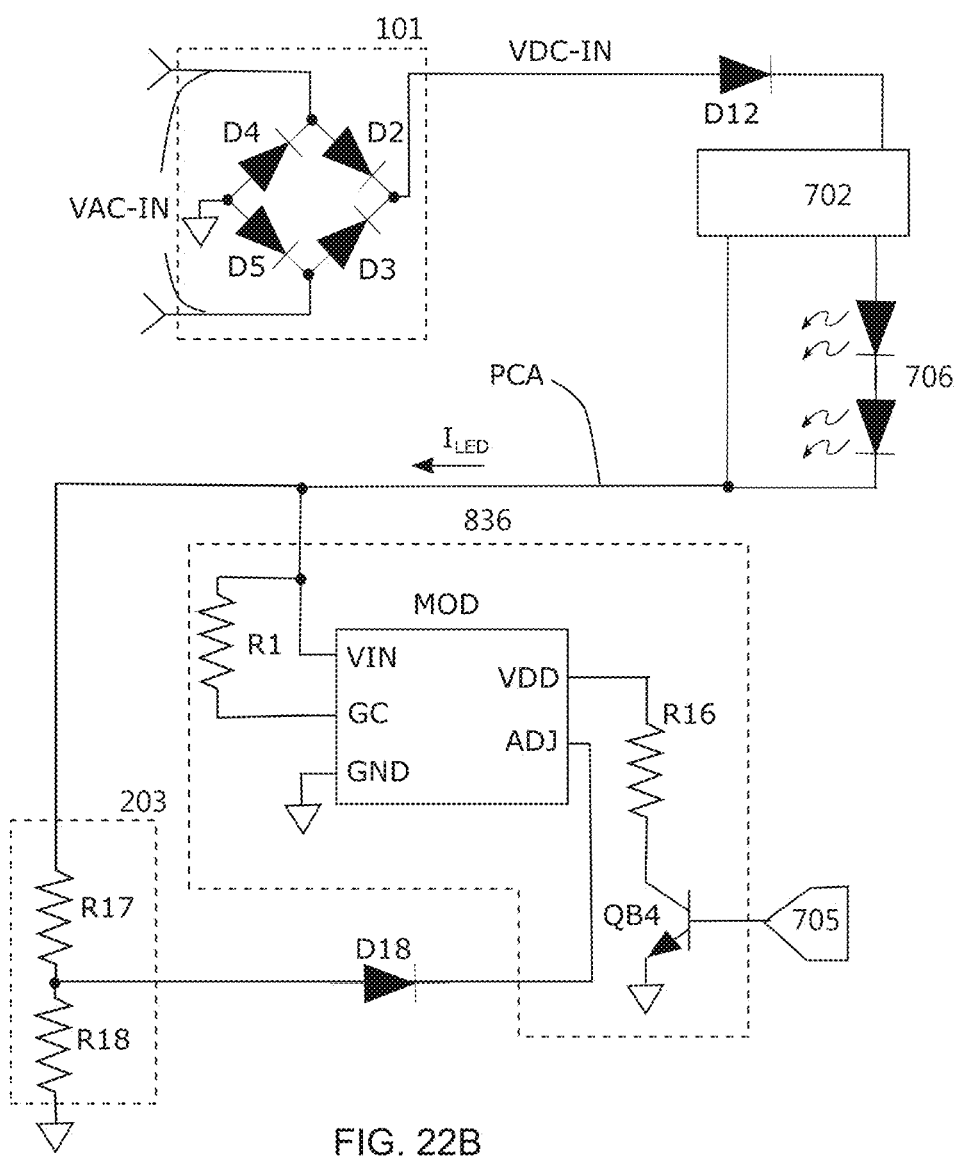
FIG. 22B shows a schematic diagram of a dimmable lighting circuit in accordance with further another embodiment of the present application.

FIG. 22B shows a schematic diagram of a dimmable lighting circuit in accordance with further another embodiment of the present application. Components, configuration, controls and/or operations the same as or similar to the foregoing embodiments described with respect to FIGS. 1A-21A may be employed in the embodiment of FIG. 21B, and detailed explanation thereof may be omitted. Being different from the light circuit 824 in FIG. 22A, the voltage divider circuit 203 of the lighting circuit 826 is connected between the connecting node PCA and the ground voltage. The controllable constant current circuit 836 and the light source 706 are connected by the connecting node PCA. With the teachings in the aforementioned, the lighting circuit 826 can perform dimming and constant power control.

Referring to FIG. 8A, the level shifter 709 is not only for voltage shifting but also for logical inversion. In FIG. 8A, the voltage of the connecting node PM is a high voltage level (logic "1") if the PWM signal 705 has a low voltage (logic "0".); the voltage of the connecting node PM is a low voltage level (logic "0") if the PWM signal 705 has a high voltage (logic "1".). In other words, the logic value represented by the PWM signal 705 is opposite to the logic value represented by the connecting node PM. When the operation of the circuit allows, the specific voltages corresponding to the logic values are not limited herein.

Figure 23:
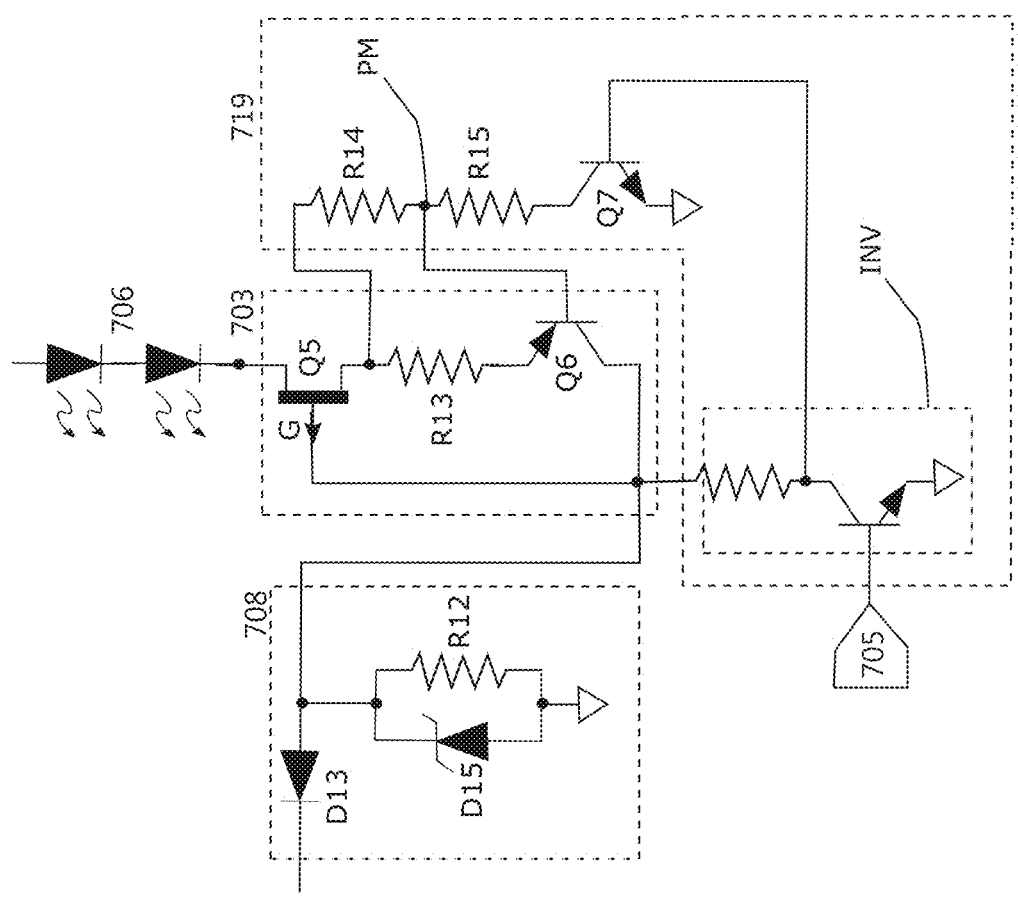
FIG. 23 shows a schematic diagram of a level shifter and circuits around in accordance with an embodiment of the present application.

FIG. 23 shows a schematic diagram of a level shifter and circuits around in accordance with an embodiment of the present application. Components, configuration, controls and/or operations the same as or similar to the foregoing embodiments described with respect to FIGS. 1A-22B may be employed in the embodiment of FIG. 23, and detailed explanation thereof may be omitted. Another level shifter 719 is a substitute for the level shifter 709 in FIG. 8A. In comparison with the level shifter 709, the another level shifter 719 further includes an inverter INV. The inverter INV can provide an inversion signal to the base of the transistor Q7 according to the PWM signal 705. According to FIG. 23, the logic value of the PWM signal 705 is same as the logic value of the connecting node PM.

In other embodiments, when an inverter is disposed between the level shifter 709 and the constant current circuit 703, the invertor generates an inversion signal according to the voltage of the connecting node PM between the resistors R14, R15 and the inversion signal is provided to the base of the transistor Q6. Thus, a similar operation of the another level shifter 719 in FIG. 23 is achieved.

Back to FIG. 8A, the charging circuit 708 charges the output power or supplies power to the wireless module 704 by almost the whole current ILED because the current flowing through the level shifter 709 is negligible. The charging circuit 708 provides the current ILED to the connecting node Vout to charge the output power or to supply power to the wireless module 704 when the PWM signal 705 drives the light source 706 to emit light and the diode D13 is conducted.

Figure 24:
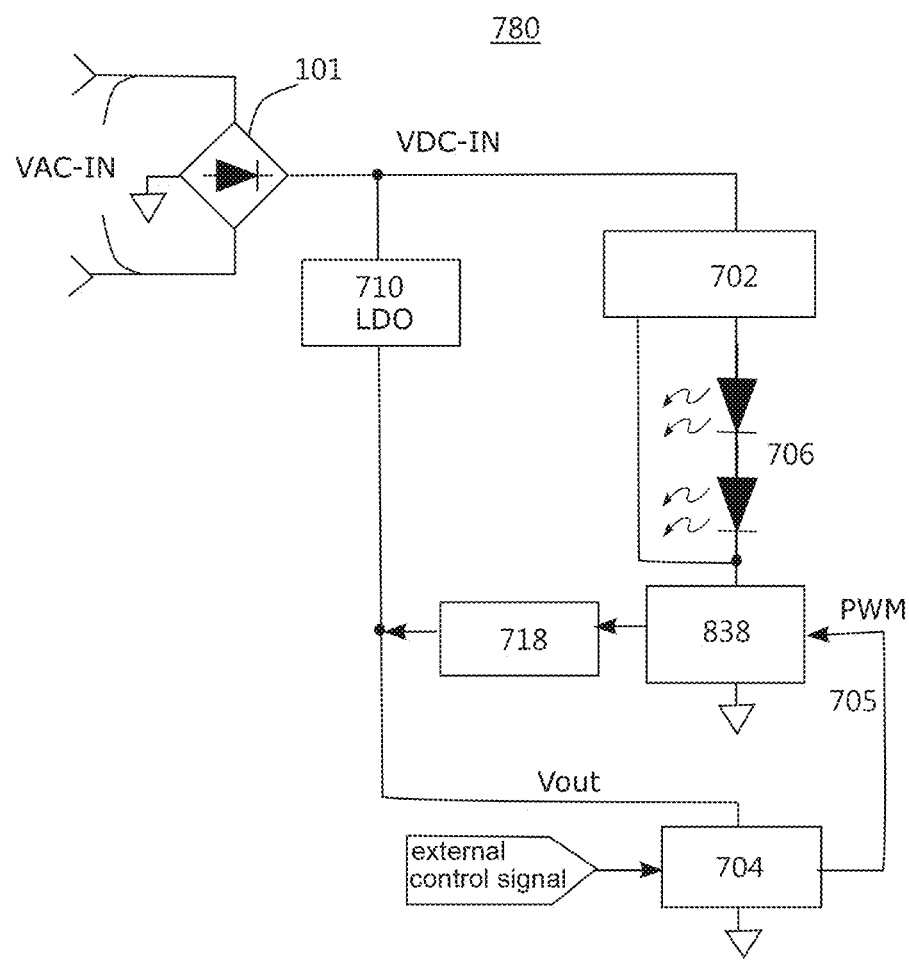
FIG. 24 shows a schematic diagram of a lighting circuit in accordance with an embodiment of the present application.

FIG. 24 shows a schematic diagram of a lighting circuit in accordance with an embodiment of the present application. The lighting circuit 780 includes a voltage converter circuit 701, a flicker reduction circuit 702, a controllable constant current circuit 838, a wireless module 704, a charging circuit 718, and a light source 706. Components, configuration, controls and/or operations the same as or similar to the foregoing embodiments described with respect to FIGS. 1A-23 may be employed in the embodiment of FIG. 24, and detailed explanation thereof may be omitted. The charging circuit 718 provides a part of the current ILED flowing through the light source 706 to the connecting node Vout to charge the output power or supply power to the wireless module 704 when the PWM signal 705 drives the light source to emit light. The charging circuit 718 does not charge the output power (corresponding to the connecting node Vout) when the PWM signal 705 drives the light source not to emit light.

Figure 25:
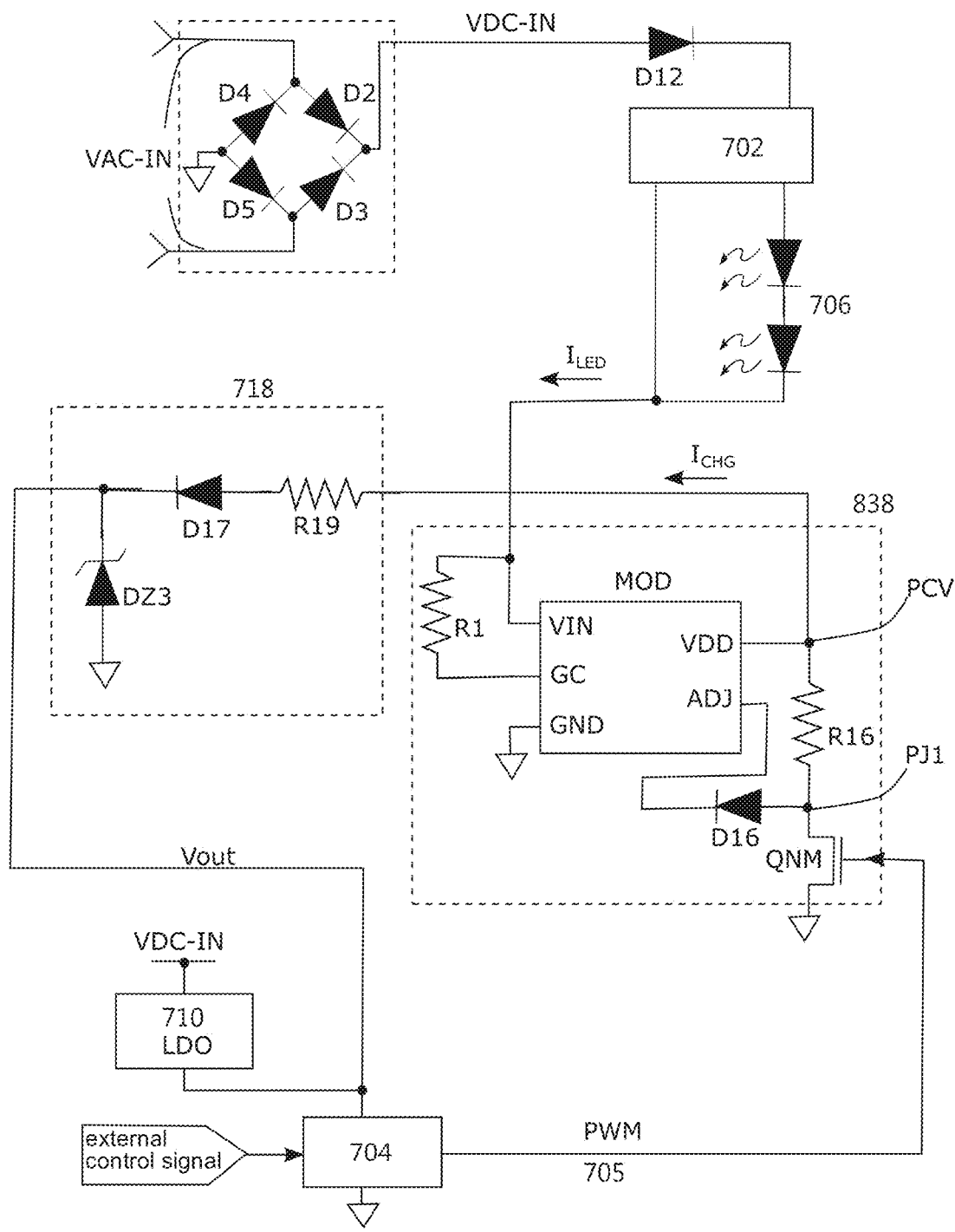
FIG. 25 shows details of FIG. 24.

FIG. 25 shows details of FIG. 24. Components, configuration, controls and/or operations the same as or similar to the foregoing embodiments described with respect to FIGS. 1A-24 may be employed in the embodiment of FIG. 25, and detailed explanation thereof may be omitted. The controllable constant current circuit 838 includes an integrated circuit MOD, resistors R1, R16, a diode D16, and a transistor QNM, with connections shown in FIG. 25. In one embodiment, the transistor QNM is an n-type MOSFET.

The transistor QNM is turned on and the voltage of the connecting node PJ1 is approximately equal to the ground voltage when the PWM signal 705 is a high voltage (logic "1"). In that case, the diode D16 is under a reverse voltage and the voltage of the connecting node PCV is approximately the sum of the breakdown voltage of the Zener diode DZ and the base-to-emitter forward voltage of the transistor QB. For example, the voltage of the connecting node PCV is maintained at 3.6V by the integrated circuit MOD and the current flowing through the resistor R6 is about 3.6V/R16, approximately being constant. In other words, the controllable constant current circuit 838 provides a constant current to drive the light source 706 to emit light when the voltage of the PWM signal 705 is a high.

The transistor QNM is turned off and the voltage of the connecting node PJ1 is increased to a sum of the forward voltage (about 0.7V) of the diode D16 and the base-to-emitter forward voltage (about 0.4V~0.7V) of the transistor QB when the voltage of the PWM signal 705 is low (logic "0"). The voltage of the connecting node PCV is larger than the voltage of the connecting node PJ1 and the voltage of the connecting node PCV is close to the voltage of connecting node PJ1 when the current flowing through the diode D16 and the resistor R16. For example, the voltage of the connecting node is maintained at 1.8V. The controllable constant current circuit 838 is regarded as disabled and the light source 706 does not emit light because the current ILED is small. In other words, the controllable constant current circuit 838 drives the light source 706 not to emit light when the voltage of the PWM signal 705 is low.

The charging circuit 718 includes a resistor R19, a diode D17, and a Zener diode DZ3, with connections shown in FIG. 25. The charging circuit 718 is connected between the connecting node Vout and the connecting node PCV and provides a current path for charging the output power or supplying power to the wireless module 704, with utilizing a part of the current $I_{LED}$ as the charging current $T_{CHG}$. The resistor R19 limits the charging current ICHG. The diode D17 prevents a current flow from the connecting node Vout to the connecting node PCV. The Zener diode DZ3 prevents the output voltage of the connecting node Vout from being too high. For example, the output voltage of the output power at the connecting node Vout is rated at 3.3V and the breakdown VBDZ3 voltage of the Zener diode DZ3 is 3.6V. In other words, the voltage of the connecting node Vout is expected to be maintained at 3.3V and not to exceed 3.6V.

As the abovementioned, the light source 706 emits light, the voltage of the connecting node PCV is maintained at 3.6V, and the voltage of the connecting node PCV is not lower than the output voltage at the connecting node Vout when the voltage of the PWM signal 705 is high. In that case, the charging circuit 718 obtains a part of the current ILED from the connecting node PCV and utilizes the part of the current ILED as the charging current ICHG to charge the output power or supply power to the wireless module 704.

The light source 706 does not emit light and the voltage of the connecting node PCV is maintained at a voltage, e.g. 1.8V, not higher than the output voltage of the connecting node Vout (being maintained at 3.3V by the LDO 710) when the voltage of the PWM signal 705 is low. In that case, the charging current ICHG is about 0A and the charging circuit 718 does not charge the output power or supply power to the wireless module 704.

It will be apparent to those having ordinary skill in the art that various modifications and variations can be made to the devices in accordance with the present disclosure without departing from the scope or spirit of the disclosure. In view of the foregoing, it is intended that the present disclosure covers modifications and variations of this disclosure provided they fall within the scope of the following claims and their equivalents.

What is claimed is:

1. A voltage converter circuit, comprising:
   a bridge rectifier;
   a first transistor, having a first end, a second end, and a third end;
   a second transistor, having a first end and a second end, wherein the first end of the first transistor and the first end of second transistor are electrically connected to bridge rectifier, and the second end of the first transistor is electrically connected to the first end of the second transistor;
   a Zener diode, comprising:
     a cathode connected to the third end of the first transistor; and
     an anode connected to the second end of the second transistor;
   a first voltage divider circuit and
   a first connecting node, wherein the first voltage divider circuit comprises a first resistor and a second resistor, and wherein the first connecting node is between the first resistor and the second resistor, and connected to the first resistor, the second resistor, and the second transistor,
   wherein the first transistor is a D-mode HEMT, the first end of the first transistor is a drain, the second end of the first transistor is a gate, and the third end of the first transistor is a source.

2. The voltage converter circuit of claim 1, further comprising a third resistor, wherein the third resistor is electrically connected to the bridge rectifier and the first end of the second transistor.

3. The voltage converter circuit of claim 1, further comprising a capacitor, wherein the capacitor is electrically connected to the cathode of the Zener diode and the third end of the first transistor.

4. The voltage converter circuit of claim 1, wherein the first resistor is connected to the bridge rectifier.

5. The voltage converter circuit of claim 1, further comprising a fourth resistor, wherein the fourth resistor is electrically connected to the bridge rectifier and the first end of the first transistor.

6. The voltage converter circuit of claim 2, further comprising a second diode, wherein the Zener diode is electrically connected to the first transistor through the second diode.

7. The voltage converter circuit of claim 1, further comprising a second connecting node between the second end of the second transistor and the anode of the Zener diode, wherein the first connecting node is connected to the second transistor through connecting the second connecting node.

8. The voltage converter circuit of claim 6, wherein the second end of the second transistor is electrically connected to second diode through the Zener diode.

9. The voltage converter circuit of claim 3, further comprising a first diode, electrically connected to the second end of the second transistor and the first connecting node.

10. The voltage converter circuit of claim 9, further comprising a third voltage divider circuit, having a fifth resistor and a sixth resistor, wherein one end of the fifth resistor is electrically connected to the first diode and another end of the fifth resistor is electrically connected to the first transistor.

11. A voltage converter circuit, comprising:
    a bridge rectifier;
    a first transistor, having a first end, a second end, and a third end;
    a second transistor, having a first end and a second end, wherein the first end of the first transistor and the first end of second transistor are electrically connected to bridge rectifier, and the second end of the first transistor is electrically connected to the first end of the second transistor;
    a Zener diode, comprising:
      a cathode connected to the third end of the first transistor; and
      an anode connected to the second end of the second transistor;
    a capacitor, wherein the capacitor is electrically connected to the cathode of the Zener diode and the third end of the first transistor;
    a first diode, electrically connected to the third end of the first transistor; and
    a third voltage divider circuit, having a fifth resistor and a sixth resistor, wherein one end of the fifth resistor is electrically connected to the first diode and another end of the fifth resistor is electrically connected to the second transistor.

* * * * *